(12) United States Patent
Rothschild

(10) Patent No.: US 11,966,004 B2
(45) Date of Patent: Apr. 23, 2024

(54) ENHANCED SECURITY THREAT DETECTION

(71) Applicant: Viken Detection Corporation, Burlington, MA (US)

(72) Inventor: Peter J. Rothschild, Newton, MA (US)

(73) Assignee: Viken Detection Corporation, Burlington, MA (US)

( * ) Notice: Subject to any disclaimer, the term of this patent is extended or adjusted under 35 U.S.C. 154(b) by 0 days.

(21) Appl. No.: 18/501,529

(22) Filed: Nov. 3, 2023

(65) Prior Publication Data

US 2024/0077638 A1     Mar. 7, 2024

Related U.S. Application Data

(63) Continuation of application No. PCT/US2023/022949, filed on May 19, 2023.
(Continued)

(51) Int. Cl.
*G01N 23/223* (2006.01)
*G01V 5/22* (2024.01)

(52) U.S. Cl.
CPC .............. *G01V 5/22* (2024.01); *G01N 23/223* (2013.01)

(58) Field of Classification Search
CPC ........... A61B 6/485; G01N 2223/1016; G01N 2223/076; G01N 23/10; G01N 23/223;
(Continued)

(56) References Cited

U.S. PATENT DOCUMENTS

| 5,642,392 A | 6/1997 | Krug et al. |
| 6,687,328 B2 | 2/2004 | Bavendiek et al. |

(Continued)

FOREIGN PATENT DOCUMENTS

| JP | H05133909 A | 5/1993 |
| KR | 20150126556 A | 11/2015 |

(Continued)

OTHER PUBLICATIONS

European Patent Office, International Search Report and Written Opinion issued in PCT Application No. PCT/US2023/063683, dated Jun. 12, 2023, 12 pages.
(Continued)

*Primary Examiner* — Don K Wong
(74) *Attorney, Agent, or Firm* — Sunstein LLP

(57) ABSTRACT

A method, and corresponding system, provides enhanced security threat detection. The method includes: irradiating a target from a stationary x-ray source having end-point energy of at least 88 keV; enabling target motion with respect to the stationary x-ray source; detecting resulting x-rays received from the target; generating an image of an interior of the target based on the resulting x-rays; performing analysis of the image for an indication of a weapon; producing signals representing an energy spectrum of the resulting x-rays; analyzing the signals for characteristic x-ray fluorescence that can be emitted from lead potentially present in the target; providing an indication, based on the signals, of a probability of lead ammunition being present; and outputting an indication of likelihood of a security threat based on the analysis of the image for the weapon indication and the probability of lead ammunition.

20 Claims, 16 Drawing Sheets

Related U.S. Application Data

(60) Provisional application No. 63/365,009, filed on May 19, 2022.

(58) Field of Classification Search
CPC ....... G01N 2223/643; G01N 2001/022; G01N 21/31; G01N 21/6428; G01N 25/54; G01V 5/22; G01V 5/26; G01V 5/281
See application file for complete search history.

(56) References Cited

U.S. PATENT DOCUMENTS

| | | |
|---|---|---|
| 7,356,115 B2 | 4/2008 | Ford et al. |
| 7,873,201 B2 | 1/2011 | Eilbert et al. |
| 8,000,436 B2 | 8/2011 | Seppi et al. |
| 8,137,976 B2 | 3/2012 | Bjorkholm |
| 8,325,871 B2 | 12/2012 | Grodzins et al. |
| 8,551,785 B2 | 10/2013 | Bjorkholm |
| 9,341,546 B2 | 5/2016 | Stuke et al. |
| 9,841,386 B2 | 12/2017 | Grodzins |
| 2003/0039332 A1 | 2/2003 | Bavendiek et al. |
| 2004/0109532 A1 | 6/2004 | Ford et al. |
| 2008/0014643 A1 | 1/2008 | Bjorkholm |
| 2009/0067575 A1 | 3/2009 | Seppi et al. |
| 2009/0175412 A1 | 7/2009 | Grodzins et al. |
| 2009/0274268 A1* | 11/2009 | Grodzins ............... A61B 6/583 378/45 |
| 2012/0045033 A1 | 2/2012 | Stuke et al. |
| 2012/0177175 A1 | 7/2012 | Bjorkholm |

FOREIGN PATENT DOCUMENTS

| | | |
|---|---|---|
| KR | 20170005781 A | 1/2017 |
| WO | 2003/085416 A2 | 10/2003 |
| WO | 2023/168407 A1 | 9/2023 |

OTHER PUBLICATIONS

European Patent Office, International Search Report and Written Opinion issued in PCT Application No. PCT/US2023/022929, dated Jul. 25, 2023, 15 pages.

Rapp, Michael et al., "Analysis of Ammunition by X-ray Florescence", Journal of the Arkansas Academy of Science, Jan. 1, 1994, pp. 140-143.

\* cited by examiner

ENHANCED SECURITY THREAT DETECTION

RELATED APPLICATIONS

This application is a continuation of PCT Application No. PCT/US23/22949, filed on May 19, 2023, which claims the benefit of U.S. Provisional Application No. 63/365,009, filed on May 19, 2022. The entire teachings of the above application are incorporated herein by reference.

TECHNICAL FIELD

The present invention relates to detection of ammunition, and more particularly to detection of lead ammunition inside a target in an x-ray scanning system that may be optionally configured to target x-ray images of the target.

BACKGROUND ART

X-ray fluorescence (XRF) is a well-known technique that can be used to identify elemental composition of materials. An x-ray source, such as a radioactive isotope or an x-ray tube, can be used to create source x-rays that can irradiate a sample of the material to be inspected. An energy-resolving detector can be used to detect characteristic fluorescence x-rays emitted by the material of the sample upon excitation. For example, lead will emit L-shell x-rays with energies of 10.5 keV and 12.6 keV, as well as K-shell fluorescence x-rays at energies of 75 and 85 keV. By detecting these specific x-ray fluorescence lines, the presence of lead can be determined, and the higher the intensity of the x-ray lines, the larger the concentration of lead that is determined to be present in the material.

As an example, Viken Detection™ designed and manufactured a lead analyzer device designed for detection of lead-based paint. The device (called the Pb200i) uses a Co-57 radioactive isotope to provide source x-rays to excite the lead atoms in the paint, and the device detects the K-alpha fluorescence x-rays at 75 keV. These x-rays have sufficient energy to penetrate easily any overlying paint that may not contain lead, allowing the levels of even deeply buried lead to be accurately measured. In contrast, the L-shell fluorescence x-rays, with their much lower energies, may not be able to penetrate the overlying paint, giving erroneous results.

SUMMARY OF THE EMBODIMENTS

The detection of guns in carry-on baggage at airports and in bags and purses being taken into various venues has been performed for many decades using metal detection systems and x-ray inspection devices. A problem with metal detectors is the lack of specificity of the signals, leading to high false alarm rates. For example, a laptop or charging device often creates signals similar to those for a small gun, which results in many of the bags having to be opened to resolve the false alarms. X-ray imaging systems that display an image of the bag's contents enable an operator to locate a weapon more easily. However, these systems also have their limitations, especially when the bag is cluttered and contains a significant number of additional items, or when the weapon is oriented so that it is not easily recognizable as a gun in the image.

Unless the x-ray inspection system provides a separate independent view of the bag from a different perspective, it is unlikely that the gun could be detected without opening the bag. However, additional x-ray views add cost, size, and complexity to the imaging system, and the additional views require the operator to look at more than one image.

Some existing backscatter imaging systems have been equipped with energy-resolving NaI detectors to detect natural emissions from radioactive materials that might have been placed in bags or parcels being scanned by the systems. In addition, it has previously been proposed to use energy-resolving detectors to detect fluorescence from nuclear materials concealed within objects being scanned. For example, it has been proposed to use XRF to detect the presence of concealed clandestine nuclear material and additionally to detect directly any heavy metal shielding (such as lead or tungsten) that may have been used to shield the nuclear material.

However, modification of backscatter or transmission x-ray imaging systems that have been deployed to detect lead ammunition or other high-Z materials is needed. For this and other reasons, enhanced weapons detections systems are desirable.

This application describes an enhanced x-ray system designed to enhance the detection of guns by detecting the lead in ammunition using x-ray fluorescence (XRF). Almost all bullets contain lead, except for copper bullets used for hunting in environmentally sensitive areas, or plastic bullets used by law enforcement or for training purposes. The K-shell x-rays of lead can be excited by an illuminating x-ray beam of source x-rays, which can be either a fan beam, as used in traditional transmission x-ray imaging, or a sweeping pencil beam, as used in x-ray backscatter imaging systems. The K-shell x-rays have energies of 75 keV (K-alpha line) or 85 keV (K-beta line), allowing them to penetrate easily through the bag and surrounding items and subsequently be detected by one or more energy-resolving detectors.

Embodiments of the invention, therefore, can enable detection of both weapons and ammunition simultaneously and can be implemented in a manner such that an indication of a probability of ammunition being present in the target is based on XRF measurements and x-ray imaging using backscattered or transmitted images within the same system and using the same x-ray source. Guns and knives can be detected in the x-ray image, either by the operator or by using automated shape-recognition algorithms. At the same time, any ammunition in the bag that contains lead can independently be detected automatically by the XRF subsystem.

In accordance with a first embodiment of the invention, a system includes:
  a. a stationary x-ray source configured to irradiate a target with source x-rays having an end-point energy of at least 88 keV during an irradiation period;
  b. a motion enablement feature configured to enable motion of the target with respect to the stationary x-ray source during the irradiation period;
  c. a set of energy-resolving detectors configured to detect resulting x-rays received from the target resulting from the irradiation during the irradiation period and to produce signals representing an energy spectrum of the resulting x-rays; and
  d. an analyzer configured to analyze the signals for characteristic x-ray fluorescence that can be emitted from lead potentially present in the target and to provide an indication, based on the signals, of a probability of lead ammunition being present in the target.

In accordance with a second embodiment of the invention, a method includes:
   a. irradiating a target during an irradiation period with source x-rays from a stationary x-ray source having an end-point energy of at least 88 keV;
   b. enabling motion of the target with respect to the stationary x-ray source during the irradiation period;
   c. detecting resulting x-rays received from the target resulting from the irradiating during the irradiation period;
   d. producing signals representing an energy spectrum of the resulting x-rays;
   e. analyzing the signals for characteristic x-ray fluorescence that can be emitted from lead potentially present in the target; and
   f. providing an indication, based on the signals, of a probability of lead ammunition being present in the target.

In accordance with a third embodiment of the invention, a system includes:
   a. means for irradiating a target during an irradiation period with source x-rays from a stationary x-ray source having an end-point energy of at least 88 keV;
   b. means for enabling motion of the target with respect to the stationary x-ray source during the irradiation period;
   c. means for detecting resulting x-rays received from the target resulting from the irradiating during the irradiation period;
   d. means for producing signals representing an energy spectrum of the resulting x-rays;
   e. means for analyzing the signals for characteristic x-ray fluorescence that can be emitted from lead potentially present in the target; and
   f. means for providing an indication, based on the signals, of a probability of lead ammunition being present in the target.

BRIEF DESCRIPTION OF THE DRAWINGS

The foregoing features of embodiments will be more readily understood by reference to the following detailed description, taken with reference to the accompanying drawings, in which.

The drawings are not necessarily to scale, emphasis instead being placed upon illustrating embodiments.

DETAILED DESCRIPTION OF SPECIFIC EMBODIMENTS

Definitions. As used in this description and the accompanying claims, the following terms shall have the meanings indicated, unless the context otherwise requires:
   a. A "set" includes at least one member.
   b. As used herein, an x-ray source or source x-rays "illuminating" a target is also referred to as an x-ray source or source x-rays "irradiating" a target.
   c. "Material" and "object" are examples of a "target."
   d. "Stationary," as used in reference to an x-ray source, x-ray scanning module, x-ray scanning system, and the like, means that the source, module, or system is configured to remain in a fixed position during an x-ray irradiation process, an x-ray scan process, or a sensing process for a particular target.
   e. "Target object," "target," and "object" are used interchangeably herein and refer to a subject that may be scanned by an x-ray scanner for imaging or sensed for any x-ray fluorescence radiation emitted from the subject. "Target object," "target," and "object" can include a person or other living being or an inanimate subject as used herein.

f. As used herein, "substantially non-perpendicular" indicates that the angle θ is small enough to increase effective thickness significantly, such as increasing effective thickness by more than 25%, more than 50%, more than 100% (an effective thickness multiplier of 2), more than 200%, or more than 400%.

Figure 1:
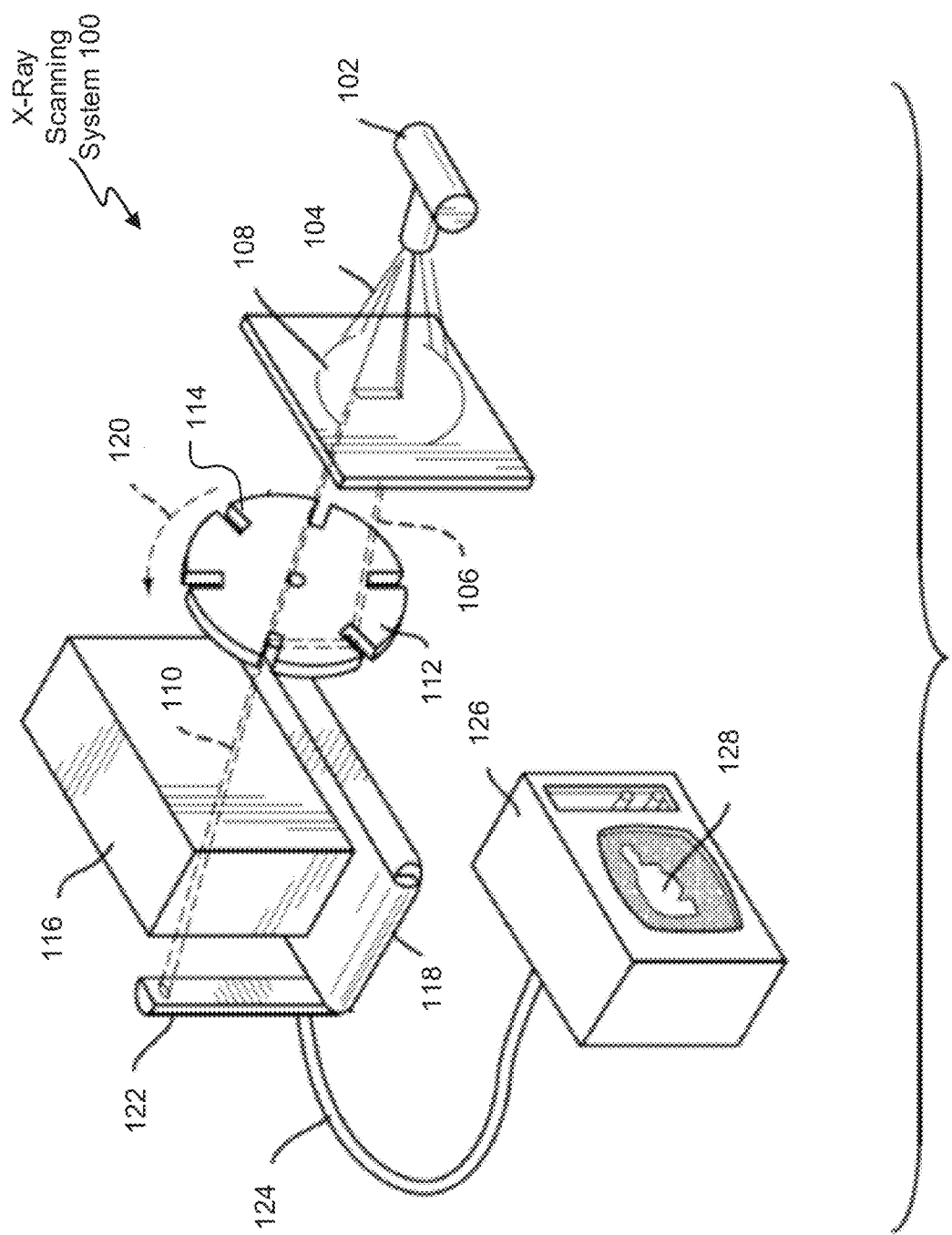
FIG. 1 (prior art) is a perspective-view illustration of an x-ray transmission imaging system utilizing a scanning beam of x-rays, the illustration showing principles applicable to backscatter and transmission x-ray imaging implemented in embodiment systems.
Figures 2A, 2B, 2C:
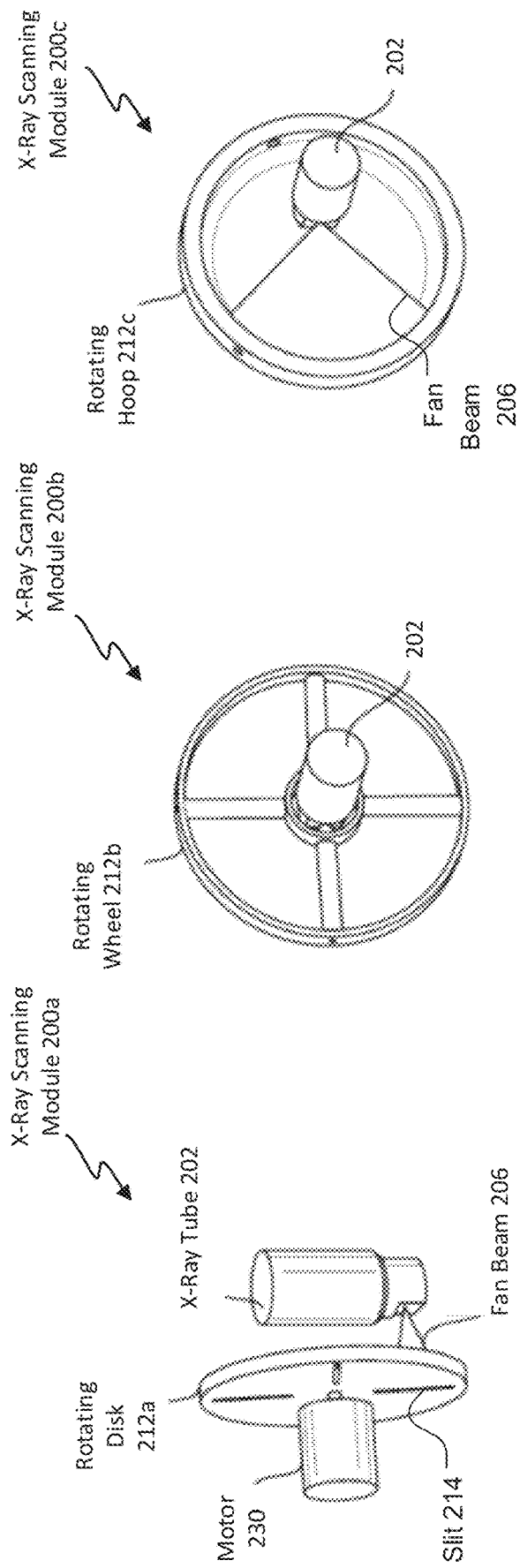
FIGS. 2A-2C (prior art) illustrate rotating disk, rotating wheel, and rotating hoop types of x-ray chopper wheels, respectively, that have been used for backscatter imaging systems.
Figure 3:
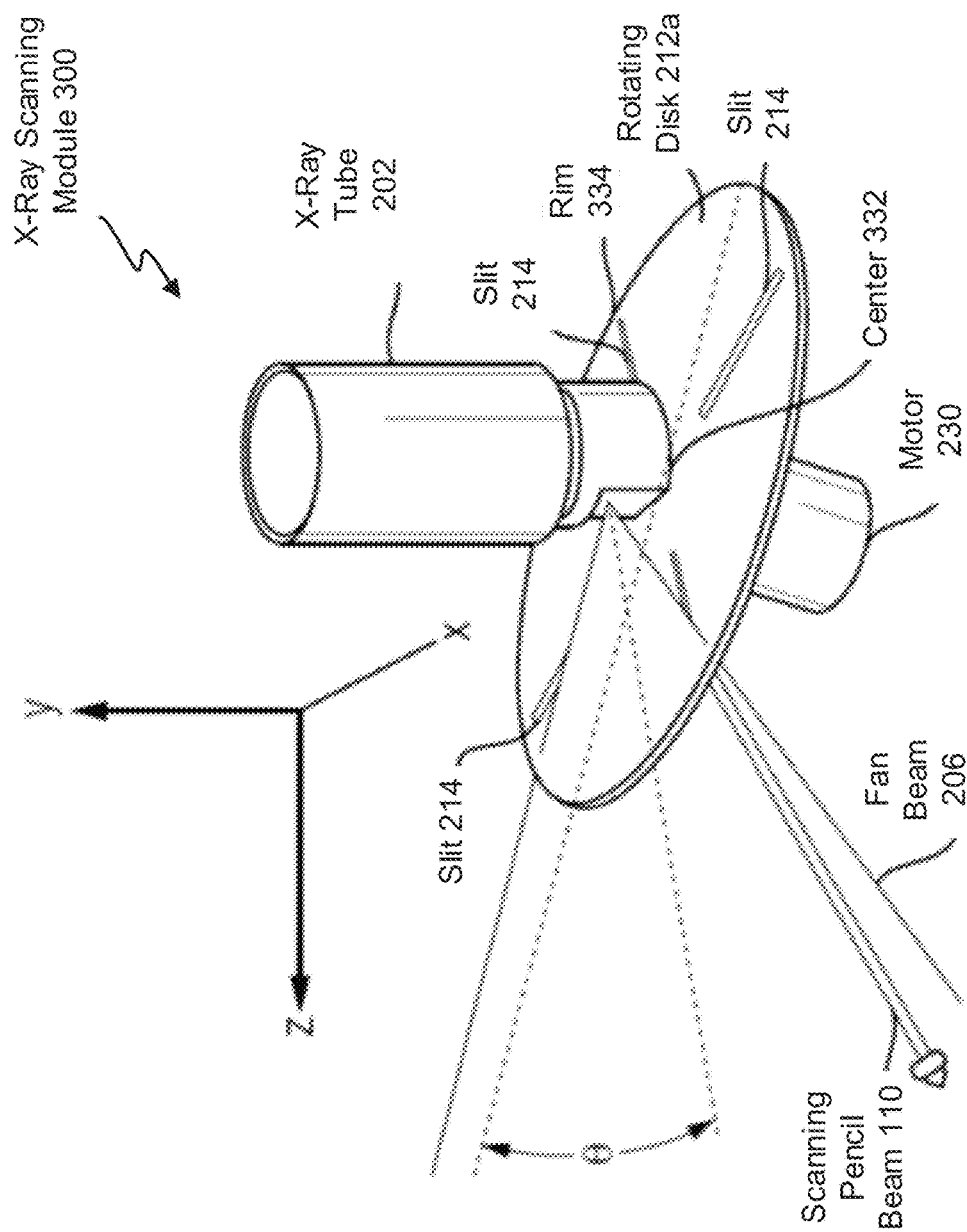
FIG. 3 (prior art) is a perspective-view illustration of a tilted or "angled" disk chopper wheel x-ray scanning module that can be advantageously used in embodiments.

FIGS. 1-3 illustrate various existing system components that may be used in embodiment systems and to which reference may be made for convenience.

FIG. 1 (prior art) illustrates basic principles of backscatter imaging in reference to a transmission imaging system 100 that uses a scanning x-ray beam in a manner similar to a backscatter imaging system. A standard x-ray tube 102 generates source x-rays 104 that are collimated into a fan beam 106 by a slit aperture in attenuating plate 108. The fan beam 106 is then "chopped" into a scanning pencil beam 110 by a rotating "chopper wheel" 12 defining slit apertures (which may also be referred to herein as "slits") 114 therein. The scanning pencil beam 110 thus scans over target object 116 (in this example a suitcase on a conveyor 118 being imaged as the chopper wheel 112 rotates with a rotation 120.

In the transmission imaging system 100 as illustrated, x-rays of the scanning pencil beam 110 that are transmitted through the target 116 are detected by a transmission x-ray detector 122, which outputs a signal via a signal cable 124 to a monitor 126, which shows an image 128 of contents of the target 116. In the same type of system, while not shown in FIG. 1, backscatter x-ray detectors may be positioned to detect x-rays from the pencil beam 110 that are scattered by the target 116 in a general or specific backward direction, such as in a vicinity between the target 116 and the chopper wheel 112. An intensity of the x-rays scattered in the backwards direction may be thus recorded by one or more large-area backscatter detectors (not shown) as a function of the position of the illuminating beam. In the case of backscatter detectors, it can be advantageous to use large-area detectors in order to detect the greatest number of x-rays scattered in various specific backward directions. By moving the object through the plane containing the scanning beam, either on a conveyor 118 or under its own power, a two-dimensional backscatter image of the object may be obtained.

FIGS. 2A-2C (prior art) illustrate three different types of existing x-ray chopper wheels used for generating a scanning pencil beam from a substantially stationary wide x-ray beam emanating either directly from an x-ray tube 202 or from the x-ray tube 202 and through an intermediary collimation plate such as the collimation plate 108 of FIG. 1, for example. The chopper wheel of existing x-ray backscatter imaging systems usually is one of three basic types: a rotating disk chopper wheel (which may also referred to herein as a "disk" or "disk chopper wheel") 212a, a rotating wheel chopper wheel (which may also be referred to herein as a "hub-and-spoke" chopper wheel) 212b, or a rotating hoop chopper wheel (which may also be referred to herein as a "hoop" chopper wheel) 212c. The three types are shown in FIGS. 2A, 2B, 2C, respectively, in x-ray scanning modules 200a, 200b, 200c, respectively. The chopper wheels 212a, 212b, 212c can be rotatably mounted in various ways that are known in the art of x-ray scanning. FIG. 2A illustrates one way of causing a chopper wheel to rotate, wherein the disk chopper wheel 212a is coupled to a shaft of a motor 230. Slits 214 defined within the disk chopper wheel 212a serve a purpose similar to that of the slits 114 in FIG. 1.

FIG. 3 (prior art) illustrates an x-ray scanning module 300. The module 300 is a more recent modification of the x-ray scanning module 200a of FIG. 2A, which has been modified in the x-ray scanning module 300 in a "tilted chopper wheel" (also referred to as an "angled chopper wheel") configuration to significant advantage. The x-ray scanning module 300 can be a particularly compact and relatively low-weight x-ray scanning module. This design is particularly advantageous in mobile scanning device applications, as it allows a smaller and lower-cost motorized vehicle with a lower maximum chassis load limit to be used. In a larger, vehicle- or cart-based mobile scanning system, it also allows a vehicle, trailer, or cart that supports the x-ray scanning module to be smaller, lighter, and more maneuverable. Thus, where the embodiments described herein may not have even been feasible or desirable previously, given the weight, expense, and difficulty of handling two massive chopper wheels in a given system, or one such massive chopper wheel on a mobile conveyance, the tilted design can solve the long-standing associated problems. Tilted disk chopper wheels are described more fully in U.S. Pat. No. 10,762,998, which is hereby incorporated by reference herein in its entirety. This chopper wheel assembly is compact, and by tilting the disk, the assembly enables a disk chopper wheel design to be used more easily at x-ray energies above 200 kV. The compactness and low weight of the tilted disk chopper wheel x-ray scanning module makes it ideal to be used on a mobile platform, and especially for a mobile dual-sided inspection system for embodiment x-ray scanning modules, systems, and methods described herein.

FIG. 3 particularly illustrates an orientation of a fan beam 328 output from an x-ray tube 202 and disk chopper wheel 212a in greater detail. The x-ray tube 202 is oriented with an axis in the Y direction. The fan beam 206 of source x-rays that are output from the x-ray tube 202 is oriented in the X-Z plane (the X-Z plane contains the fan beam 206). The plane of rotation of the chopper disk lies at an oblique non-perpendicular angle θ to the X-Z plane. The scanning pencil beam 110 also is scanned in the X-Z plane, i.e., the beam plane, as the chopper disk rotates. The disk chopper wheel 212a includes a rim 334 and center 332, and the slits 214 are oriented to extend radially toward the rim and center. The chopper disk 212a is rotated by means of a motor 230.

The chopper disk 212a is not oriented in either the X-Z plane or the X-Y plane, but, rather, in a disk plane that is at an angle θ with respect to the beam plane (X-Z plane) of the fan beam 206. The disk plane can also be referred to as a plane of rotation (or rotational plane) of the chopper disk 212a, because the disk remains parallel to this plane as it rotates. The disk plane can be parallel to the X axis. By positioning the plane of the rotating disk at an acute (substantially non-perpendicular) angle θ to the plane of the fan beam, the actual thickness of the disk can be reduced by a factor $F=1/\sin(\theta)$ while keeping the disk's effective thickness the same. As used herein, "substantially non-perpendicular" indicates that the angle θ is small enough to increase effective thickness significantly, such as increasing effective thickness by more than 25%, more than 50%, more than 100% (an effective thickness multiplier of 2), more than 200%, or more than 400%.

Any of the x-ray scanning modules 200a, 200b, 200c and 300 may be modified to be included in a system having a set of energy-resolving detectors for use in connection with embodiments described herein.

A problem with metal detectors is the lack of specificity of the signals, leading to high false alarm rates. For example, a laptop or charging device often creates signals similar to those for a small gun, which results in many of the bags having to be opened to resolve the false alarms. X-ray imaging systems that display an image of the bag's contents enable an operator to locate a weapon more easily. However, these systems also have their limitations, especially when the bag is cluttered and contains a significant number of additional items, or when the weapon is oriented so that it is not easily recognizable as a gun in the image.

Figure 4:
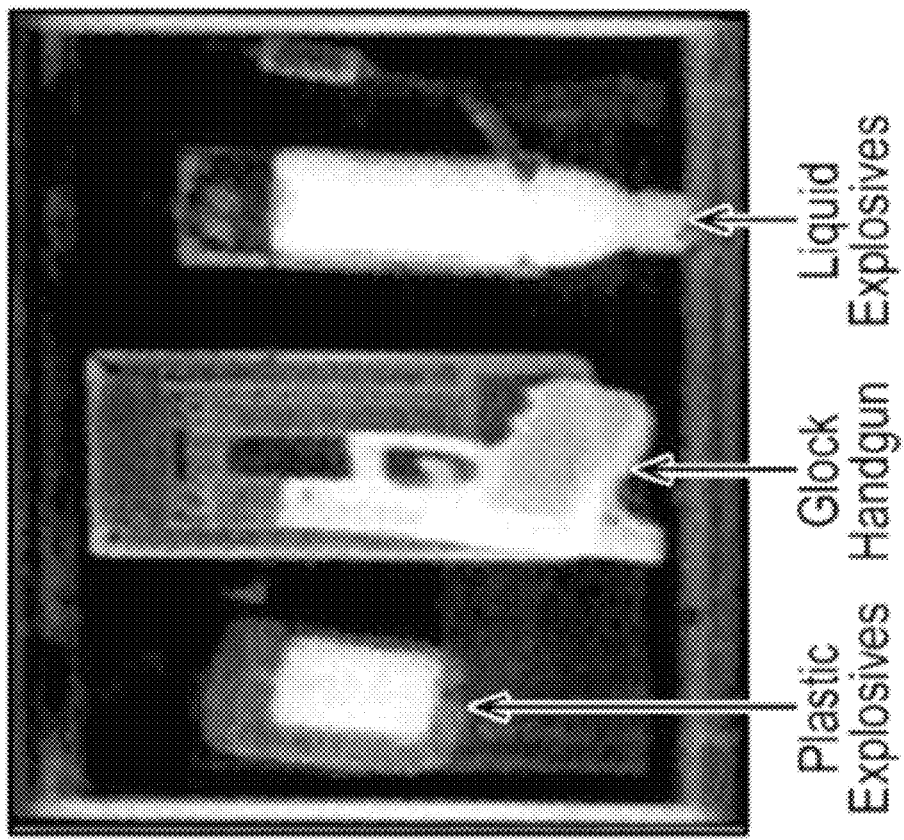
FIG. 4 shows example x-ray transmission (left) and x-ray backscatter (right) images of the inside contents of a small briefcase target acquired simultaneously with a sweeping X-ray beam in a prior art system.
Figure 4:
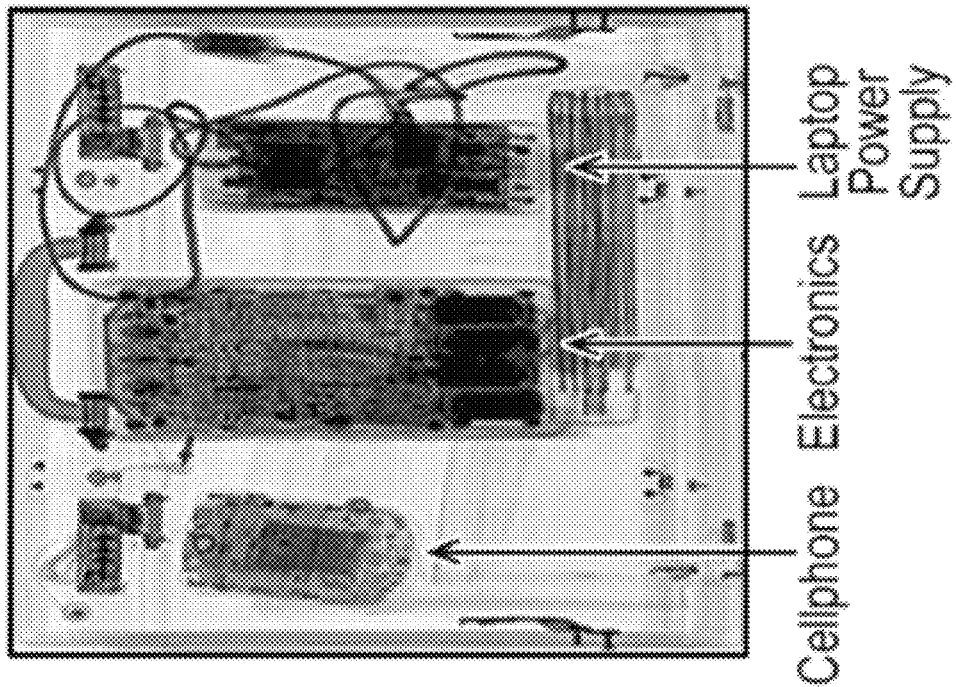

FIG. 4 shows example x-ray transmission (left) and x-ray backscatter (right) images of the inside contents of a small briefcase target acquired simultaneously with a sweeping X-ray beam in a prior art system. X-ray backscatter imaging has been shown to preferentially favor the detection of highly scattering organic materials which may not be easily visible in a conventional X-ray transmission image. The transmission images, on the other hand, preferentially favor the detection of highly absorbing metallic items such as weapons. By combining the two imaging modalities, metallic and non-metallic threats can be advantageously detected.

Example embodiments described herein include a compact X-ray inspection system for detecting concealed threats in objects such as bags, packages, or other containers. Such embodiments may perform inspections without requiring a conveyor belt, allowing them to take up less room and to be less intrusive. This advantage is especially beneficial in locations where aesthetic considerations are important, such as in hotel, hospital, or museum lobbies. Rather than rely on a linear translation of the inspected object through the X-ray beam, the initial primary scan of the inspected object may involve rotation of the object in the plane of the incident beam.

Various embodiment systems can perform both x-ray fluorescence measurements and x-ray transmission imaging, x-ray backscatter imaging, or both.

Figure 5:
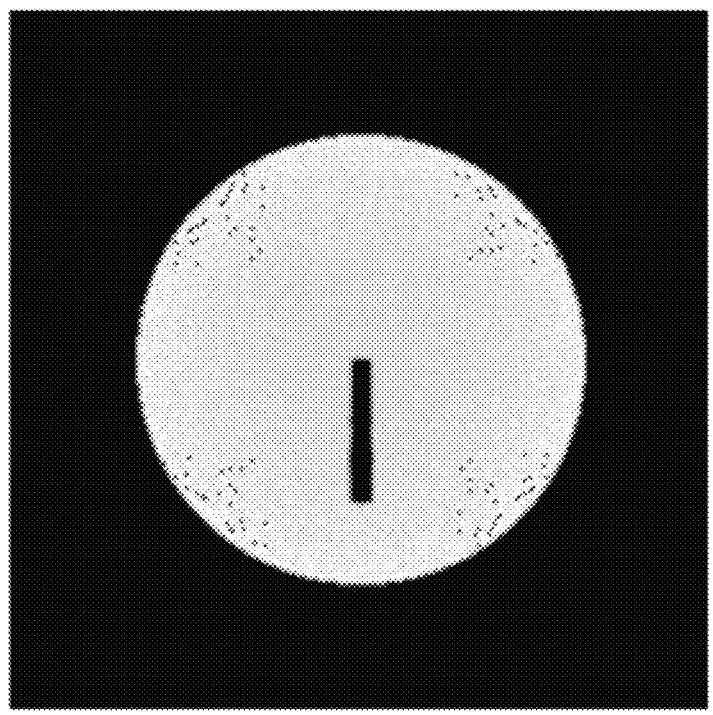
FIG. 5 is a set of two simulated x-ray images of a gun perpendicular to the path of the illuminating x-rays (left) and lying in a plane parallel to the path (right).
Figure 5:
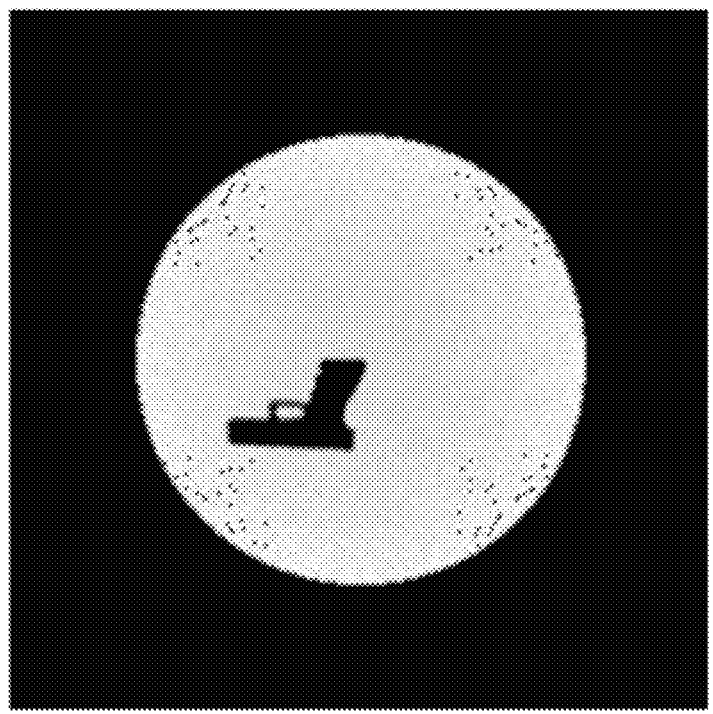

FIG. 5 shows an example of an x-ray transmission image and x-ray backscatter image obtained in the same scan by the same existing system. FIG. 5 shows images of a gun, inside a bag target, lying in a plane perpendicular to the path of the illuminating x-rays (left), and when it is lying in a plane parallel to the path (right). Unless the x-ray inspection system provides a separate independent view of the bag from a different perspective, it is unlikely that the gun could be detected without opening the bag. However, additional x-ray scan views add cost, size, and complexity to the imaging system, and the additional views require the operator to look at more than one image.

Some existing backscatter imaging systems have been equipped with energy-resolving NaI detectors to detect natural emissions from radioactive materials that might have been placed in bags or parcels being scanned by the systems. In addition, it has previously been proposed to use energy-resolving detectors to detect fluorescence from nuclear materials concealed within objects being scanned. For example, it has been proposed to use x-ray fluorescence (XRF) to detect the presence of concealed clandestine nuclear material and additionally to detect directly any heavy metal shielding (such as lead or tungsten) that may have been used to shield the nuclear material.

However, to the inventor's knowledge, it has not been previously discovered how to modify any stationary backscatter or transmission x-ray imaging systems that have been deployed to use XRF to detect lead ammunition or other high-Z materials. For this and other reasons, enhanced weapons detections systems are needed.

This application describes an enhanced x-ray system designed to enhance the detection of guns by detecting the lead in ammunition using x-ray fluorescence (XRF). Almost all bullets contain lead, except for copper bullets used for hunting in environmentally sensitive areas, or plastic bullets used by law enforcement or for training purposes. The K-shell x-rays of lead can be excited by an illuminating beam, which can be either a fan beam, as used in traditional transmission x-ray imaging, or a sweeping pencil beam, as used in x-ray backscatter imaging systems. The K-shell x-rays have energies of 75 keV (K-alpha line) or 85 keV (K-beta line), allowing them to penetrate easily through the bag and surrounding items and subsequently be detected by one or more energy-resolving detectors.

Embodiments of the invention, therefore, can enable detection of both weapons and ammunition simultaneously. Guns and knives can be detected in the x-ray image, either by the operator or by using automated shape-recognition algorithms. At the same time, any ammunition in the bag that contains lead can independently be detected automatically by the XRF subsystem.

In embodiments herein that include a scanning x-ray beam, an "x-ray source" as used herein can be part of an x-ray scanning module that includes an x-ray source such as an x-ray tube and also means for creating a scanning beam from x-rays that are output from the x-ray source. Example means for creating a scanning beam can include chopper wheels that are known by those of ordinary skill in the art of x-ray scanning, which can be known by various names such as "disk," "drum," "hub and spoke," and "hoop" chopper wheels, for example. A scanning module can include other components such as collimators. Examples of these features are illustrated in FIGS. 1-3.

The one or more energy-resolving detectors can include a cadmium-telluride (CdTe) detector or a cadmium-zinc-telluride (CdZeTe) or a cesium-lead-bromide detector. However, other types of detectors are available, such as silicon PIN diodes or Silicon Drift Detectors (SDD's). However, these types of detectors are typically suitable only for lower energy x-rays below about 25 keV and are therefore not suitable for the detection of K-shell lead x-rays, which have an energy of approximately 75-85 keV. The detectors can be cooled to provide higher energy resolution, allowing the detection limits of the lead or other materials to be lowered. For example, Amptek® provides a small CdTe detector in a TO-8 can which has an active diameter of about 5 mm and contains a piezo-electric cooler contained within the can. This detector is very compact, with an exterior diameter of only about 15 mm.

Figure 6:
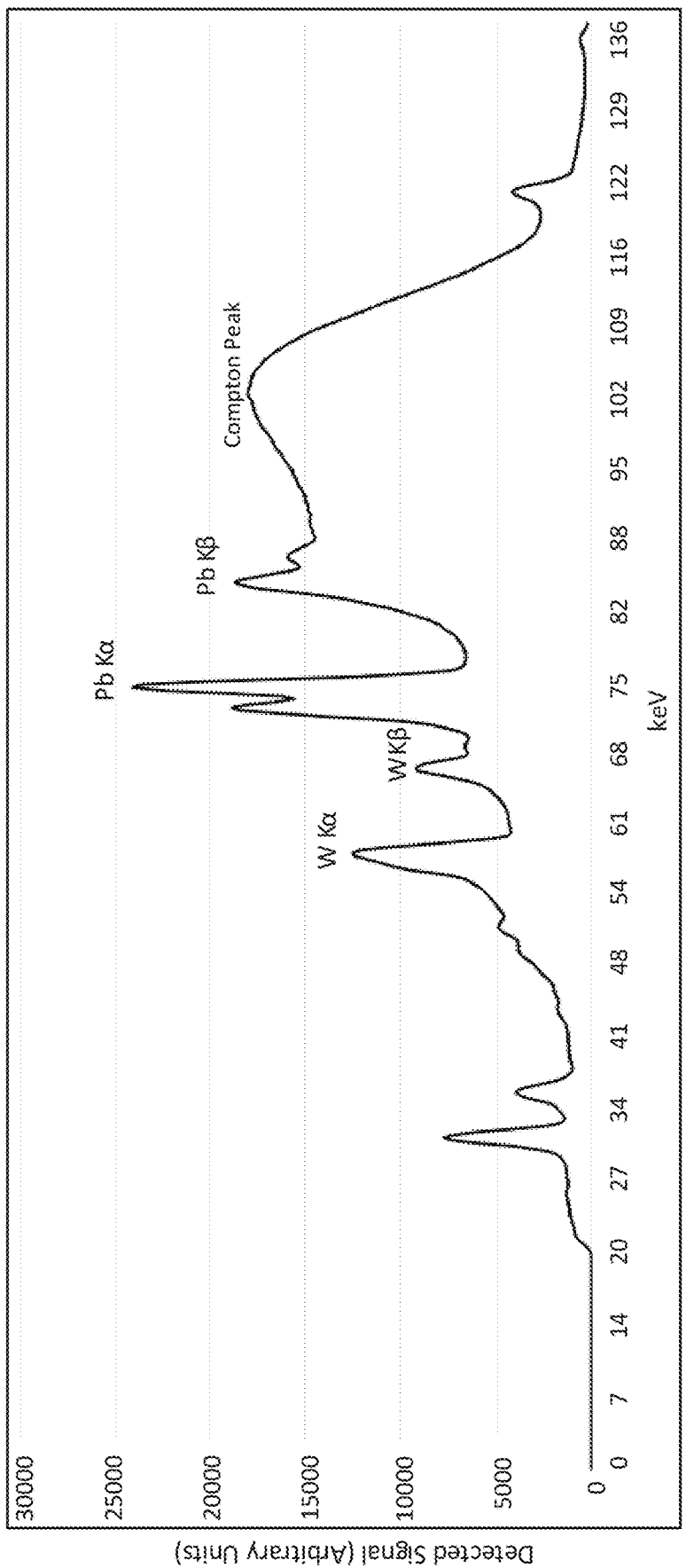
FIG. 6 is a graph showing a representative energy spectrum obtained with a cooled CdTe detector in a lead paint analyzer, which is useful in understanding x-ray fluorescence (XRF) analysis that may be performed in embodiments.

FIG. 6 shows a spectrum acquired with the Amptek® CdTe detector for a lead paint sample target containing lead, excited with a Co57 radioactive isotope source. The lead K-alpha and K-beta x-rays are clearly visible above the Compton scatter background, as are the tungsten lines from the shielding surrounding the x-ray source.

Large-volume detectors with inherently low energy resolution, such as sodium iodide (NaI), can also be used, but such large-volume, lower-resolution detectors can be less preferable in embodiments because they can have difficulty in identifying small amounts of lead against the large Compton scatter background produced as the incident x-rays scatter off the bag. Despite absorbing more K-shell x-rays due to their size from any concealed lead, these detectors are unlikely to provide the required sensitivity.

Numerous applications of embodiments and variations of embodiments will be apparent to those skilled in the art in view of this disclosure. For example, the lead contained in ammunition concealed in vehicles can be detected by adding one or more XRF detectors to a drive-through X-ray portal, such as the Viken Detection™ Osprey™ system. The Osprey™ UVX™ system scans the undercarriage of vehicles by illuminating the vehicle with a beam of x-rays from below. By placing one or more XRF detectors under the roadway, adjacent to the backscatter detectors, ammunition concealed within the lower parts of the vehicle can be automatically detected from the obtained spectra. The Osprey™ EVX™ system scans the sides and top of vehicles by illuminating the vehicle with a beam of x-rays from the side, or diagonally from the side and top. By placing one or more XRF on the sides and/or top of the inspection tunnel, ammunition concealed within the sides and upper parts of the vehicle can be automatically detected from the obtained spectra.

Figure 7:
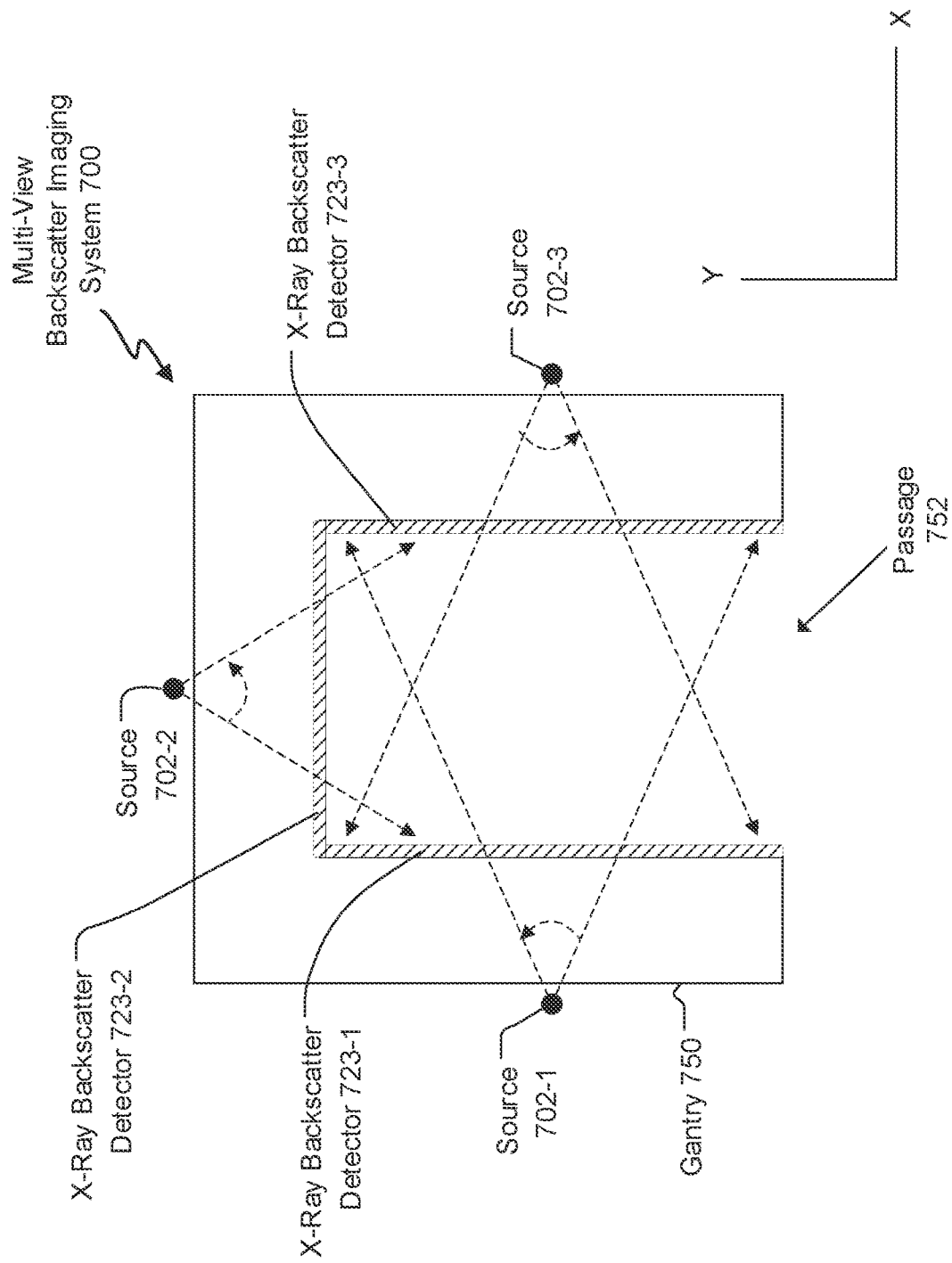
FIG. 7 (prior art) shows an existing multi-view backscatter imaging system in the form of a vehicle portal, which may be modified according to features described herein in order to detect ammunition.

FIG. 7 (prior art) illustrates an existing multi-view x-ray backscatter imaging system 700. This is an example of a vehicle portal system in which the present embodiments may be implemented by addition of XRF detection. The system 700 is in the form of a portal having a gantry 750 with a passage 752 to enable vehicles to pass through. Sources 702-1, 702-2, 702-3 may be scanned as part of scanning modules that are not shown. Respective x-ray backscatter detectors 723-1, 723-2, 723-3 are used to detect the resulting x-rays that are backscattered from a target passing through the passage 752 in a longitudinal direction parallel to a z-axis and perpendicular to the X-Y plane that is illustrate. While not shown, similar systems may be equipped for x-ray transmission imaging also.

The system 700 shows three sweeping x-ray beams emanating from the sources to acquire left, right, and top-down backscatter images simultaneously. With temporal interleaving, because only one x-ray beam is active at any given time, the x-ray sources can be mounted so that the beams are essentially coplanar, without any issues of crosstalk between the three views. This allows the system to be quite compact along the direction of motion of the vehicle, the z direction (longitudinal direction) perpendicular to the X-Y plane in which the page is oriented as shown, and in which a vehicle travels through the portal. Accordingly, all three sources can be mounted on a single portal structure in the form of the gantry 750, such as illustrated in FIG. 7.

Figure 8:
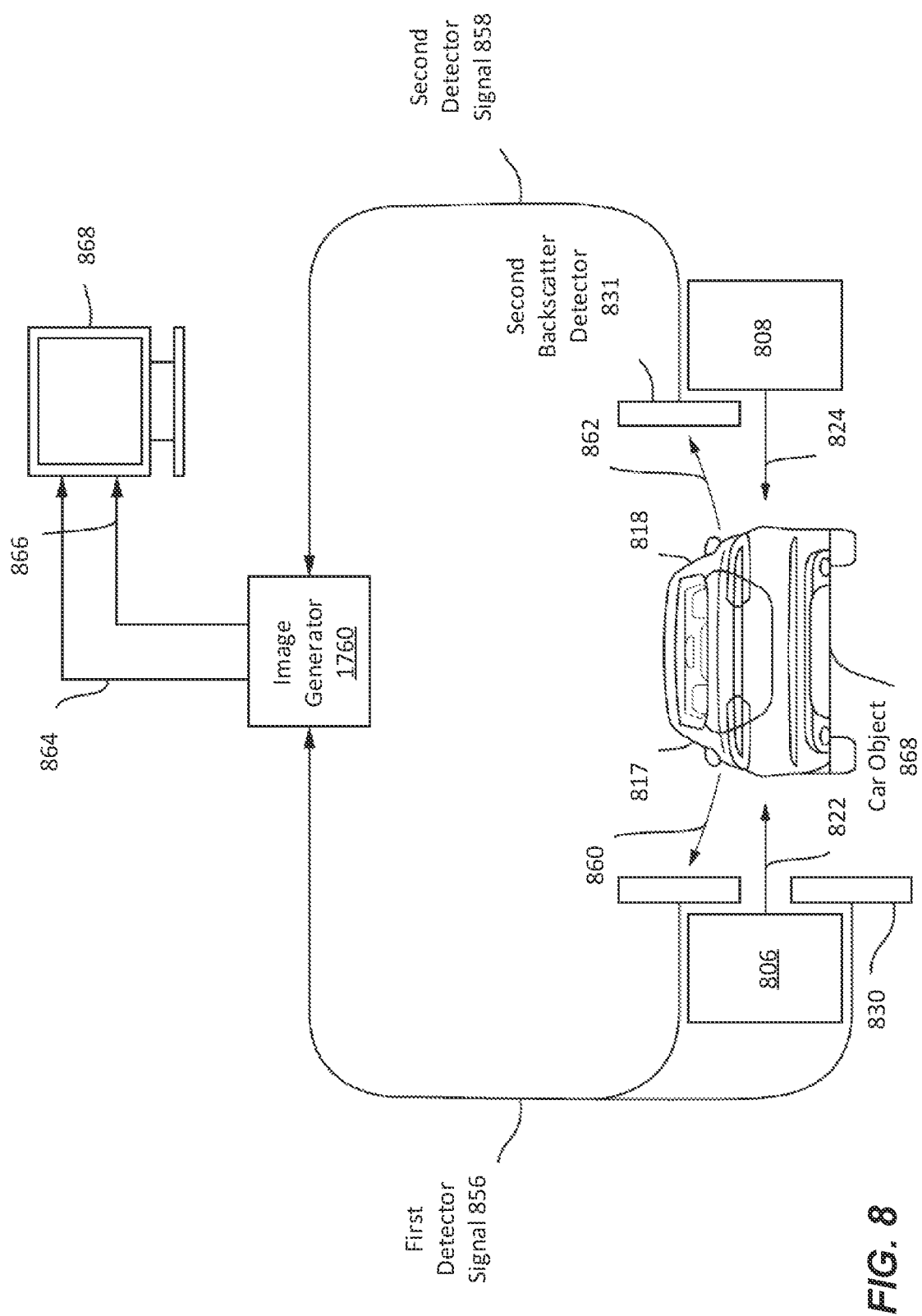
FIG. 8 (prior art) shows additional detailed components that may be included in a multi-view backscatter x-ray imaging system, such as used for a vehicle portal, which may be modified to include XRF analysis and ammunition detection according to embodiments.

FIG. 8 (prior art) is a schematic diagram illustrating example components and a flow of signals that may be implemented in embodiment systems, such as a portal system as shown in FIG. 7, together with XRF detection, which is not illustrated in FIG. 8, but which is further described hereinabove and hereinafter. Shown in FIG. 8 are the car target object 816 at an inspection site, the first x-ray scanning module 806 outputting the scanning x-ray beam 822 toward the near side 817 of the car, and the second x-ray scanning module 808 outputting a scanning x-ray beam 824 toward the far side 818 of the car. First backscattered x-ray radiation 860 is scattered from the near side 117 of the car, and received at first backscatter detectors 830. Second scattered x-ray radiation 862 is scattered from the far side 818 of the car object 816 and received at a second backscatter detector 831.

The first backscatter detectors 830 and the second backscatter detectors detector 831 produce first and second detector signals 856 and 858, respectively, in response to the respective scattered radiation 860 and 862, respectively. The signals 856, 858 are input into an image generator 870, which is configured to create a first backscatter x-ray image from the first detector signal 856 and a second backscatter x-ray image from the second detector signal 858. The first and second backscatter images 864, 866, respectively, may be viewed at a monitor 868 and viewed by an operator, for example, who is checking the images for contraband. In general, one or more image generators 870 may be used to create the first and second backscatter images, or transmission images for systems that include transmission detectors, for example. An image generator 870 can include a computer processor, for example.

Figure 9:
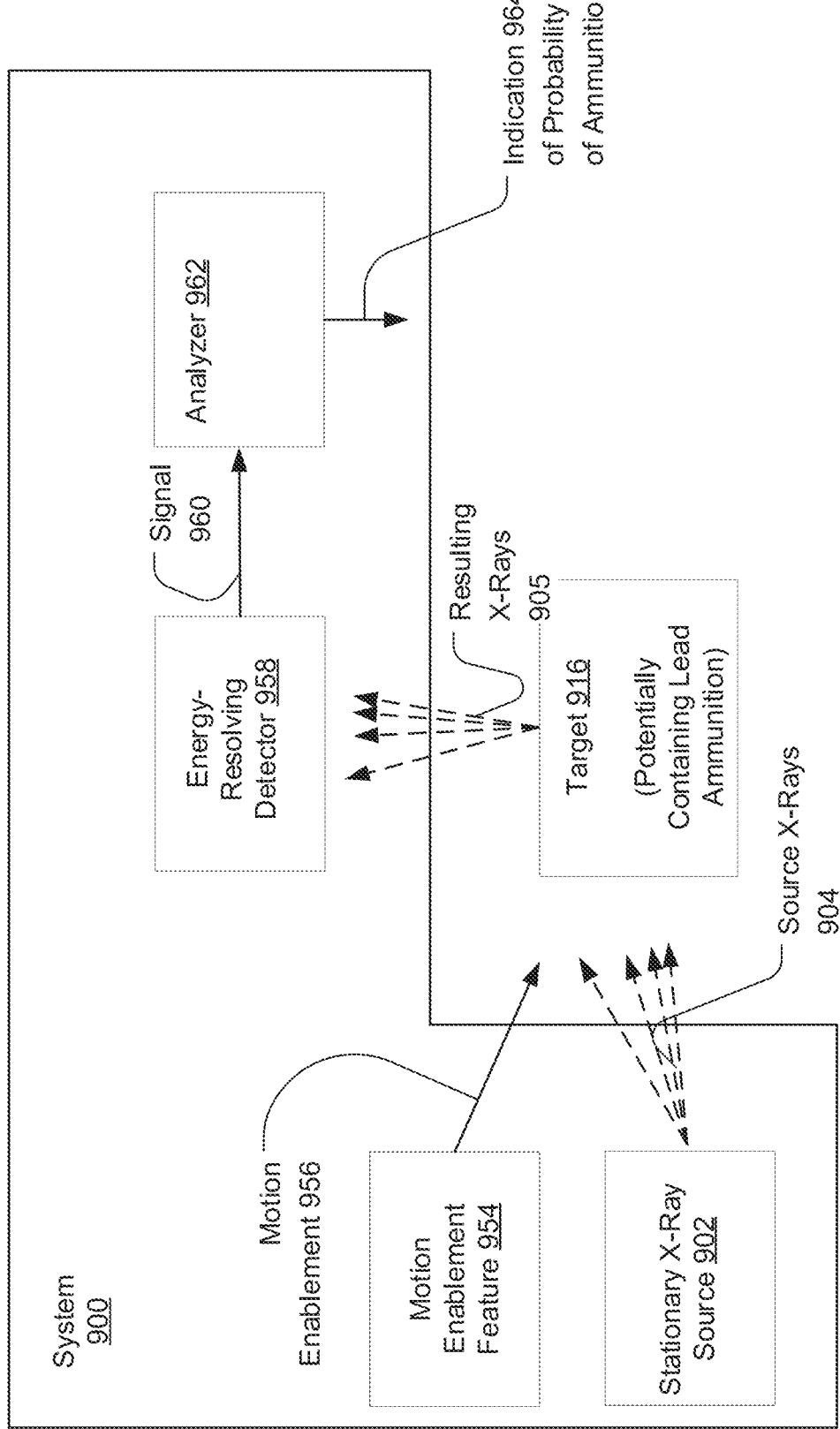
FIG. 9 is a schematic block diagram illustrating a generalized embodiment system that can detect concealed ammunition within a target object.

FIG. 9 is a schematic block diagram illustrating a more generalized embodiment system 900 that is configured to detect concealed ammunition within a target object 916. FIG. 9 may further be understood in reference to FIGS. 1-8. The target object 916 in the system 900 can potentially include weapon ammunition including lead. In other embodiments, the system can be modified appropriately for detection of other types of ammunition or other materials, where it will be understood that each material has a characteristic x-ray fluorescence emission spectrum.

The system 900 of FIG. 9 includes a stationary x-ray source 902 that is configured to illuminate (irradiate) the target object 916 with source x-rays 904. The x-ray source can be an x-ray tube 102, 202, as in FIGS. 1-3, for example, and can include a variety of other components that are known in the art, which will be understood by those of ordinary skill in the art in view of this disclosure. The x-ray source 902, for example, may be part of a fan beam x-ray source to produce a fan beam, such as the fan beams 106, 206 in FIGS. 1-3. In some embodiments, a collimator that is separate from the x-ray tube can be used. An example collimator slit 108 is shown in FIG. 1. In some embodiments, the stationary x-ray source 902 can be part of an x-ray scanning module that includes (i) an x-ray source such as an x-ray tube; and (ii) means for scanning the x-ray source to create and output a scanning pencil beam, such as the pencil beam 110 in FIGS. 1 and 3. Such scanning means can include various types of chopper wheels that are known to those of skill in the art of x-ray scanning, such as in FIGS. 1-3. Nonetheless, in some embodiments, the x-ray source outputs a stationary fan beam or a cone beam of source x-rays.

The system of FIG. 9 also includes at least one energy-resolving detector 958 that is positioned to receive resulting x-rays 905 from the target 916, which result from the irradiation of the target with the source x-rays 904. The resulting x-rays 905 may include x-rays that are backscattered (or side- or forward-scattered) from the target 916, x-rays that are transmitted through the target 916, or characteristic x-ray fluorescence that can be emitted from lead or other heavy metals if these things are contained within the target object 916. It will be understood in view of the disclosure above that a target object 916 can include a weapon such as a gun, or the target object can include a suitcase, bag, car, person, or other target object in which a weapon, or ammunition for a weapon, that may be concealed.

The system of FIG. 9 also includes an analyzer 962 that is configured to receive a signal 960 from the energy resolving detector. The output signal can be in the form of an analog signal, a digital signal, or a spectrum, such as the spectrum of FIG. 6. In any form, the signal 960 includes information representing an energy spectrum of resulting x-rays. Based on the output signal 958, which are representative of the energy spectrum, the analyzer itself can generate a spectrum or single signal as needed, where the spectrum can be such as the example spectrum of FIG. 6. The analyzer 962 can be configured, as will be understood in view of this disclosure together with information available to those of skill in the art of x-ray scanning, to receive the output signal 960 from the energy resolving detector 958 and to determine a probability of the target object containing ammunition. An indication 964 of probability of ammunition being present in the target 916 can thus be provided from the analyzer 962 to a display, to an operator in another form, to another module in the system 900, or to an entity outside of the system 900. The analyzer 962 can optionally be configured to generate an alarm signal based at least on the output signal of the one or more energy resolving detectors and on the probability of the object containing ammunition. An example optional alarm is described hereinafter in reference to FIG. 10.

The system of FIG. 9 can further include any of the features described hereinabove or hereinafter. In various particulars, the stationary x-ray source can be configured to irradiate the target with the source x-rays formed into a fan beam, as illustrated in example FIGS. 1, 2A, 3, 11, and 13. The stationary x-ray source can form part of an x-ray scanning module that is configured to irradiate the target with the source x-rays formed into a scanning pencil beam, as show in example FIGS. 1, 3, 12, and 14.

Figure 10:
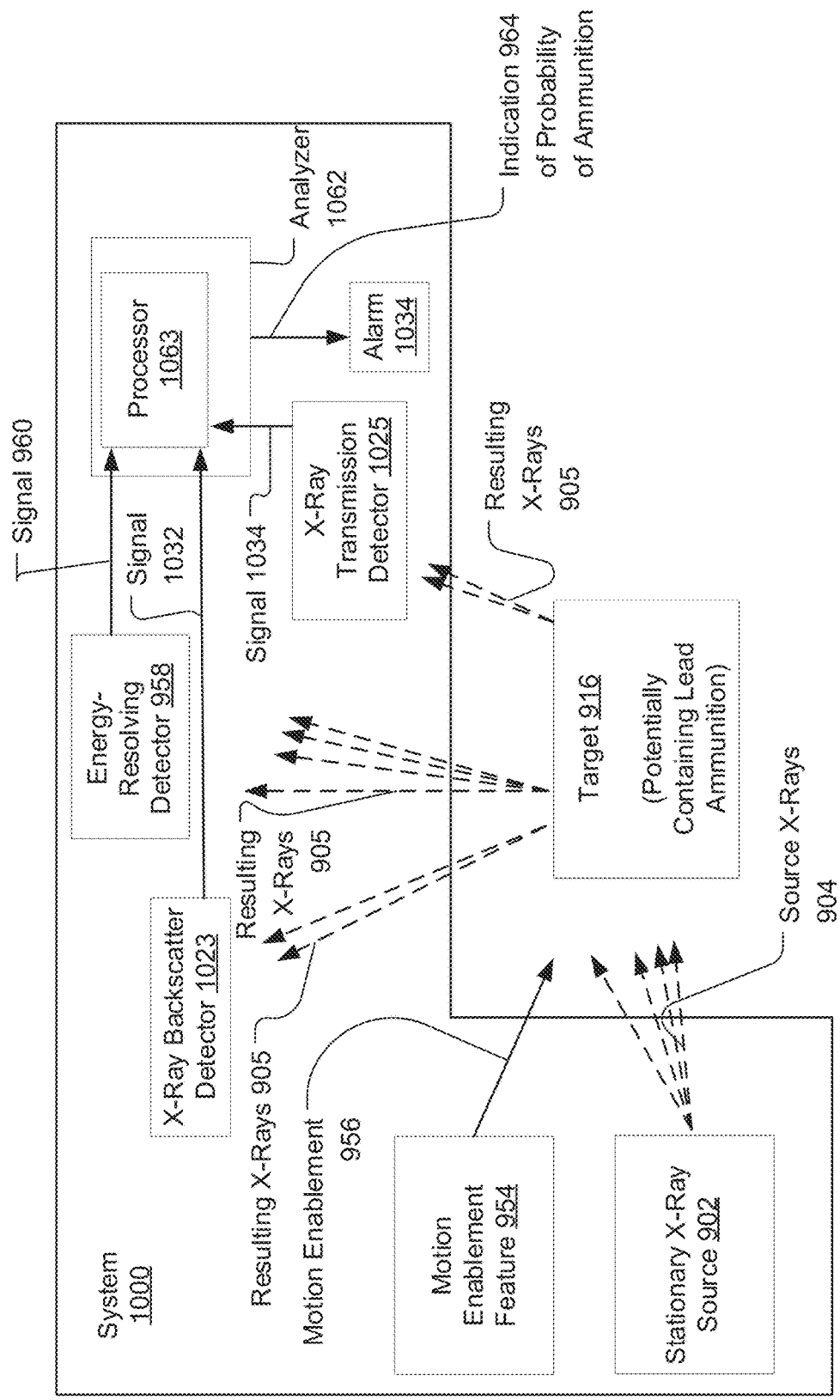
FIG. 10 is a schematic block diagram illustrating additional features, such as x-ray imaging, which may be included in embodiment systems.

The system can further include a set of x-ray detectors configured to detect x-rays selected from a group consisting of scattered x-rays that are scattered from the target, transmitted x-rays that are transmitted through the target, and combinations thereof. Single detectors are illustrated in example FIGS. 1, 12, and 14. A dual detector configuration including transmission and backscatter detection is shown in FIG. 10, for example.

An image generator can be configured to receive detector signals from the set of x-ray detectors, as shown by example image generator 870 in FIG. 8. The processor 1063 of FIG. 10 may also perform this function if desired. The image generator may generate an image of an interior of the target based on the detector signals, such as the images illustrated in FIGS. 4-5.

The determination of probability of ammunition being present based on the spectral data can be done in a wide variety of ways, as will be apparent in reference to FIG. 6. In one example, if the Pb K shell alpha and beta peaks each rise at least 10% above the immediate surrounding background, then the probability may be assumed to be 60%, for example. Accurate percentages can be determined by measurement and calibration via a lookup table, for example, based on peak heights of the Pb K shell lines in a spectrum like FIG. 6. More complex determinations may be made, such as taking into account full width at half max of the K shell peaks, determination of how much higher the K shell peaks are than the Compton peak, etc.

The probability can be based further on the image of the interior of the target. For example, a separate probability of a weapon being present may be determined based on the image. A processor may assign a high percentage likelihood to an image such as on the left of FIG. 5, such as 95%, while the image on the right of FIG. 5 is merely consistent with a weapon and can receive a lower percentage, such as 25%. These determinations can be refined based on empirical determinations, testing, machine learning, developing lookup tables, and the like. In one example, basing an ammunition likelihood on both the image and on the XRF spectral data may assign the maximum percentage calculated for each of these, or a sum, or an average, or a weighted average, as the final percentage likelihood of ammunition being present or of a weapon being present. A "threat" more generally can include ammunition, a weapon, plastic explosives, liquid explosives, a knife, etc. in various embodiments.

Referring to FIG. 10, with further reference to FIGS. 1-9, a schematic block diagram illustrating certain additional optional features that may be included in the system 900 of FIG. 9 is provided. FIG. 10 shows a system 1000 that includes many components of the system 900, such as the stationary x-ray source 902, motion enablement feature 954, energy-resolving detector 958, motion enablement 956, and source x-rays 902, all operating in connection with the target 916 (which does not form part of the system 900 or the system 1000).

The system 1000 further includes components and functions enabling x-ray imaging of the target, in in addition to the XRF and ammunition detection. For example, the system 1000 includes an x-ray backscatter detector 1023 and an x-ray transmission detector 1025. These detectors, in addition to the energy-resolving detector 958, detect resulting x-rays 905 that can emanate from the target 916 in response to irradiation by the source x-rays 904. It should be understood that the energy spectral content of x-rays 905 received by the detectors 958, 1023, 1025 may differ based on placement of the detectors with respect to the incident source x-rays and the target, as well as sensitivities of the respective detectors. For example, it is known that Compton x-ray scattering varies in intensity according to detection angle with respect to the source x-ray angle, for example. It can be helpful, for this reason, to place the detectors at certain preferred positions, and examples are illustrated in FIGS. 11-14. The detector 958 is preferably placed in a position to minimize receipt of Compton-scattered x-rays and to maximize opportunity to receive fluoresce x-rays from the target, such as lead K-shell fluorescence.

The x-ray backscatter detector 1023 output a detector signal 1032, and the x-ray transmission detector 1025 outputs a detector signal 1034. In the example system 1000, signals 960, 1032, 1034 are all received at a processor 1063 that is present in the analyzer 1062. In this manner, the processors 1063, and hence, the analyzer 1062, can output the indication 964 of probability of ammunition being present in the target 916 on both XRF information received at the detector 958 and on imaging data, such as the imaging data illustrated in FIGS. 4-5. In this manner, the indication 964 of probability may be significantly enhanced. Optionally, the indication 964 can be received at an alarm 1034 that is present in the system 1000. The alarm can be an audible alarm, visual alarm, indication on a screen, flashing light, or any other means to alert or notify a person or system that a threshold probability of ammunition being present in the target 916 has been reached. For many applications, such as for border security and airport security, this threshold may be chosen to be quite low, such as a 5 or 10% likelihood. Further, the indication can be more reliable given the noted synergy of both imaging and XRF detection in the same system, such that false positives may be less likely, saving time and money in security and threat screening.

A further embodiment may be understood by reference to FIG. 9, FIG. 10, and more generally all of FIGS. 1-16. An x-ray scanning system can include an x-ray source configured to irradiate a target with source x-rays having an end-point energy of at least 88 keV during an irradiation period. The source need not be stationary, but can be mounted in a handheld scanner or in a vehicle or cart-based scanner, for example, and the scanner may be moved while the target remains stationary. More preferably, the end-point energy is at least 100 keV. A set of one or more energy-resolving detectors can be configured to detect resulting x-rays received from the target resulting from the irradiation during the irradiation period and to produce energy spectrum signals representative of an energy spectrum of the resulting x-rays. A set of imaging detectors configured to detect x-rays selected from the group consisting of resulting x-rays that are scattered from the target during the irradiation period, resulting x-rays that are transmitted through the target during the irradiation period, and combinations thereof. The set of imaging detectors can be further configured to output imaging signals representative of an x-ray image of an interior of the target. An image generator such as 870 or the analyzer 1062 can generate an image an x-ray image of the interior of the target based on the imaging signals. The same analyzer or generator can be configured to analyze the signals for characteristic XRF that can be emitted from lead potentially present in the target and to provide an indication, based on the signals, of a probability of lead ammunition being present in the target. The analyzer can further be configured to use the probability and the x-ray image to determine a likelihood of a security threat in the target.

The system can be mounted at a position selected from a group consisting of inside a vehicle, on a trailer, on a cart, on a platform, on a table, on a ground surface, on a floor surface, and combinations thereof. The system can be a handheld system. The system can further including any of the features of other embodiments of this applications.

FIGS. 11-14 show particular embodiments that are especially useful for, but not limited to, scanning of suitcases, bags, and other small containers.

Figure 11:
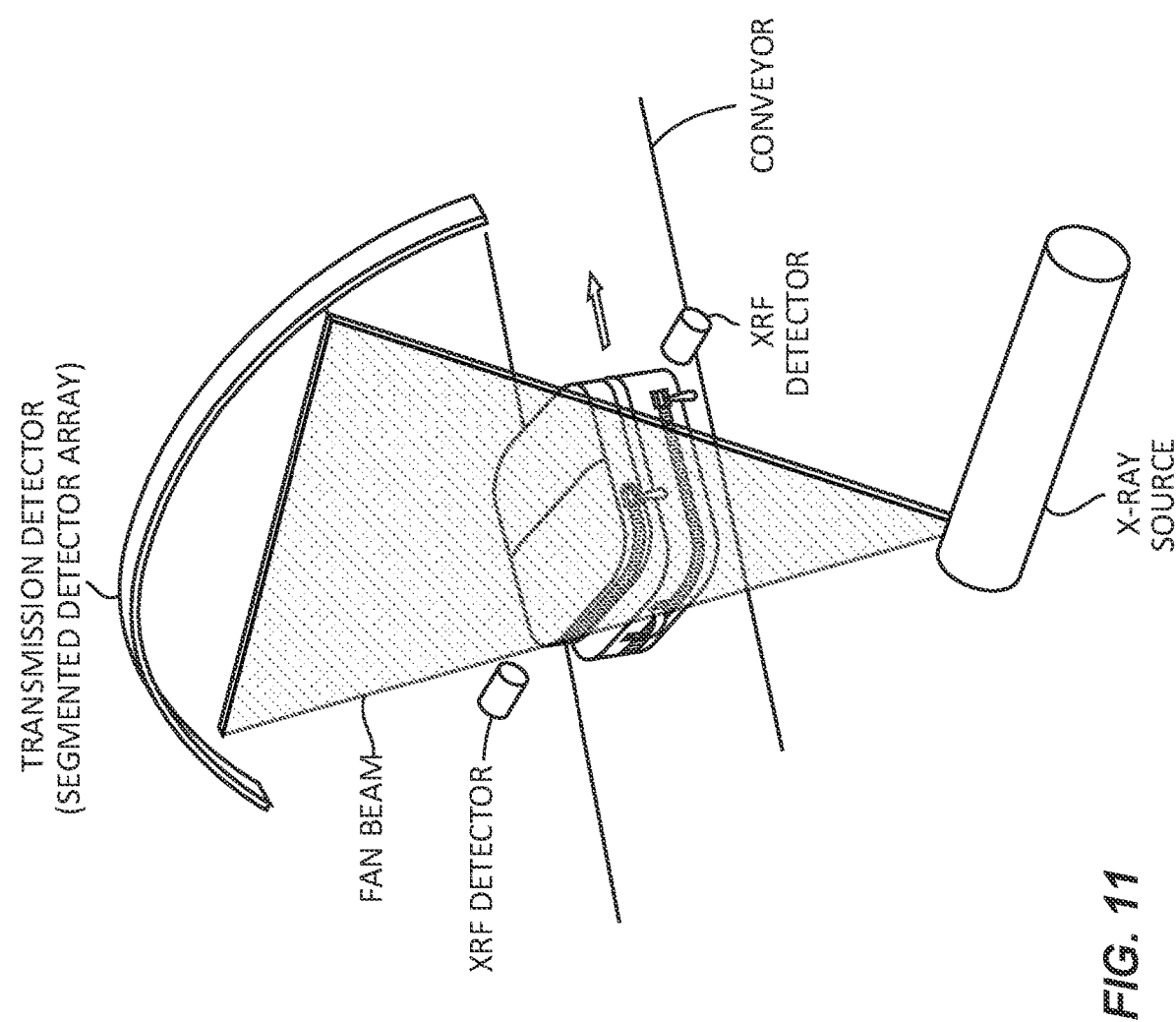
FIG. 11 is a perspective diagram illustrating an embodiment system for scanning a bag on a conveyor with a fan beam of source x-rays and a pair of XRF detectors on either side of the conveyor.

Referring to FIG. 11, with further reference to FIGS. 1-10, FIG. 11 illustrates a first particular embodiment. A conveyor carries the object to be inspected through the incident fan beam of x-rays created by an x-ray source. A transmission detector including a segmented array of detector elements is positioned to measure the intensity of x-rays transmitted through the object at each point across the fan beam, allowing a two-dimensional x-ray transmission image of the object to be created as it is moved through the beam. Algorithms can be used to perform shape recognition on guns and knives in the x-ray image to generate automated alarms for the presence of weapons. One or more XRF detectors are positioned to measure any scatter and/or fluorescence coming from the object as it is illuminated by the beam. The spectra obtained from the XRF detectors can be analyzed to look for excess counts above the Compton background in the regions of interest at the specific energies of the lead K-shell fluorescence x-rays. If excess counts are found above a threshold level of excess counts, an automated alarm signifying the presence of lead-containing ammunition can be generated.

Figure 12:
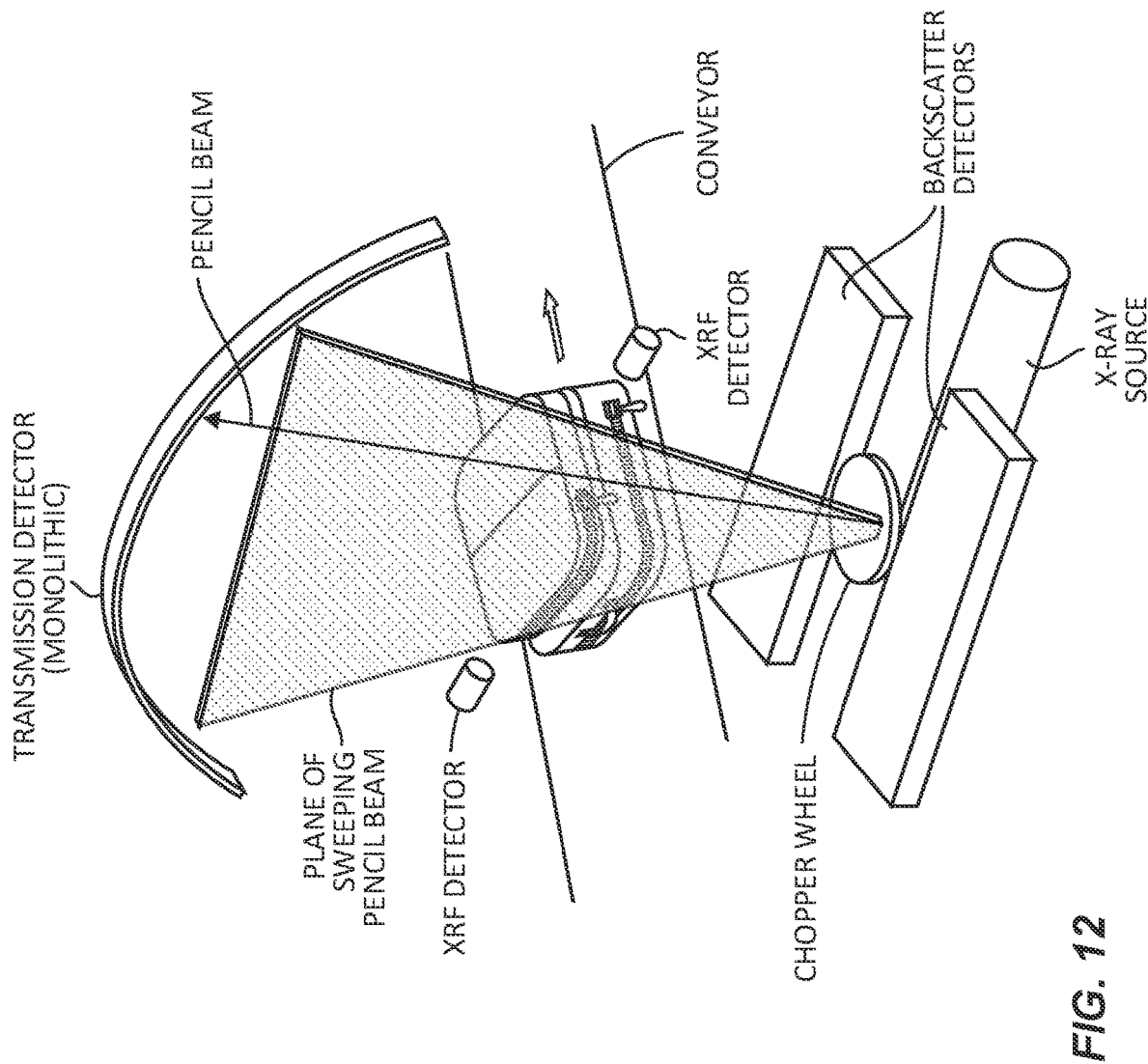
FIG. 12 is a perspective diagram illustrating an embodiment system for scanning a bag on a conveyor and with the pair of XRF detectors on either side of the conveyor, as in FIG. 11, but with a sweeping pencil beam of x-rays.

Referring to FIG. 12, with further reference to FIGS. 1-11, FIG. 12 illustrates a second particular embodiment. A conveyor carries the object to be inspected through the plane swept out by a sweeping beam of x-rays created by an x-ray source. The sweeping beam can be created, for example, by a rotating chopper wheel or by other means known in the art. A monolithic, non-segmented transmission detector is positioned to measure the intensity of the x-ray beam transmitted through the object at each point during the sweep of the beam across the object, allowing a two-dimensional x-ray transmission image of the object to be created as it is moved through the beam. Methods, which can incorporate algorithms implemented in particular executable code, for example, can be used to perform shape recognition on guns and knives in the x-ray image to generate automated alarms for the presence of weapons. Optionally, one or more backscatter detectors can be placed under, or to the side, of the conveyor to simultaneously create backscatter images of the object. The scatter image can be useful for detecting non-metallic threats, such as explosives. One or more XRF detectors are positioned to measure any scatter and/or fluorescence coming from the object as it is illuminated by the beam. The spectra obtained from the XRF detectors can be analyzed to look for excess counts above the Compton background in the regions of interest at the specific energies of the lead K-shell fluorescence x-rays. If excess counts are found above a threshold level of excess counts, an automated alarm signifying the presence of lead-containing ammunition can be generated.

Example embodiments described herein include a compact X-ray inspection system for detecting concealed threats in objects such as bags, packages, or other containers. Such embodiments may perform inspections without requiring a conveyor belt, allowing them to take up less room and to be less intrusive. This advantage is especially beneficial in locations where aesthetic considerations are important, such as in hotel, hospital, or museum lobbies. Rather than rely on a linear translation of the inspected object through the X-ray beam, the initial primary scan of the inspected object may involve rotation of the object in the plane of the incident beam.

Figure 13:
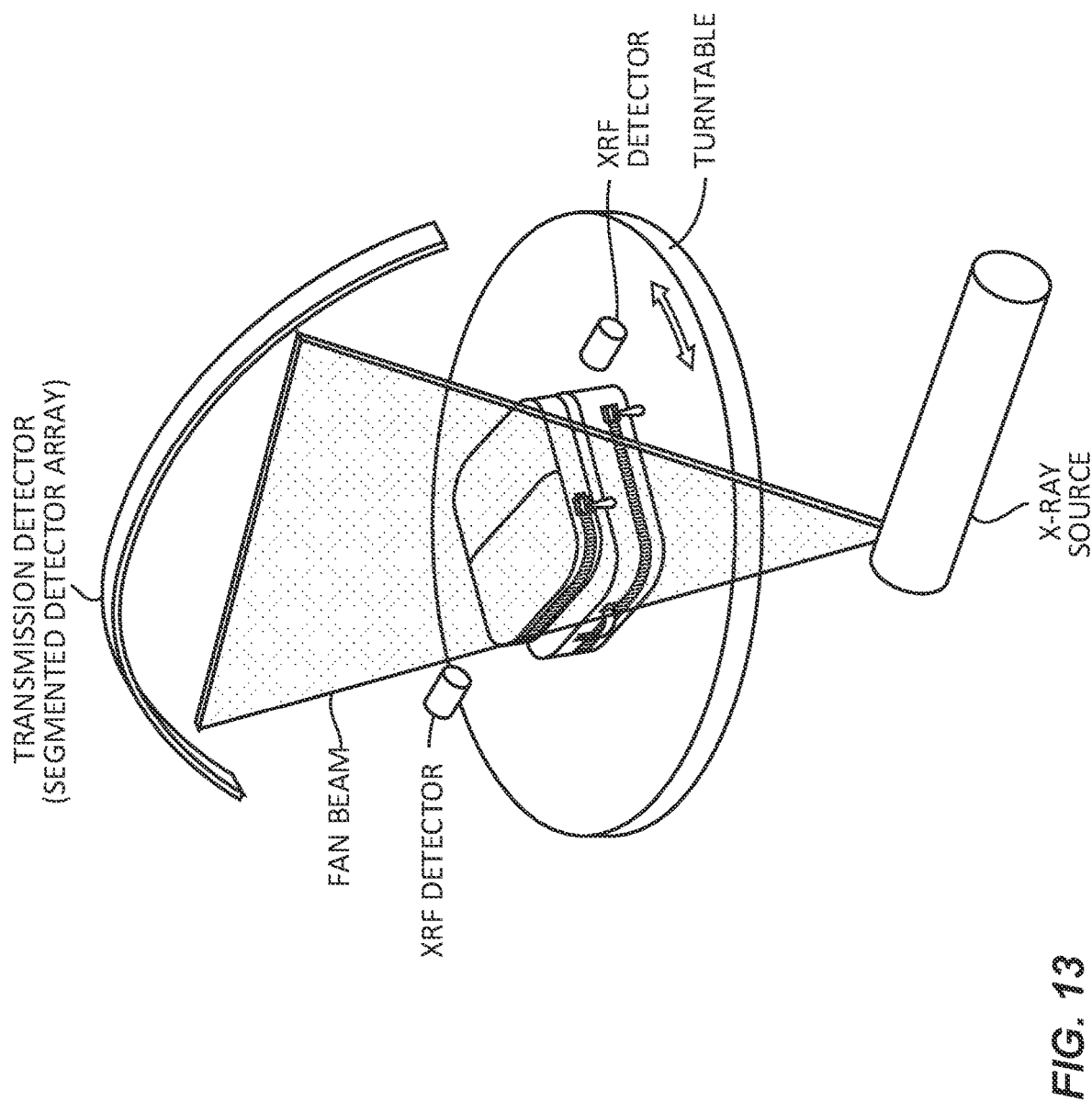
FIG. 13 is a perspective diagram illustrating an embodiment system for scanning a bag on a on a rotating turntable with a fan beam of x-rays and a pair of XRF detectors on either side of the bag.

Referring to FIG. 13, with further reference to FIGS. 1-12, FIG. 13 illustrates a third particular embodiment. The conveyor in the system shown in FIG. 11 is replaced in FIG. 13 with a radiation-transparent turntable. In greater particular, FIG. 13 is a diagram of a single-view detector system 40 that uses a fan beam and segmented transmission detector array in one embodiment. The system 40 may include a turntable 41, an X-ray source 43, a segmented transmission X-ray detector 45, and a controller 42. The turntable 41 may be any rotation mechanism configured to rotate an object 49 about a substantially vertical axis. The X-ray source 43 may generate an X-ray beam 48 in a substantially vertical plane (e.g., aligned with the vertical axis). The X-ray detector 45 may detect at least a portion of the X-ray beam transmitted through the object 49 during rotation and generate image data based on the detected X-ray beam. The controller 42 may then generate an image of the object based on the image data.

Figure 14:
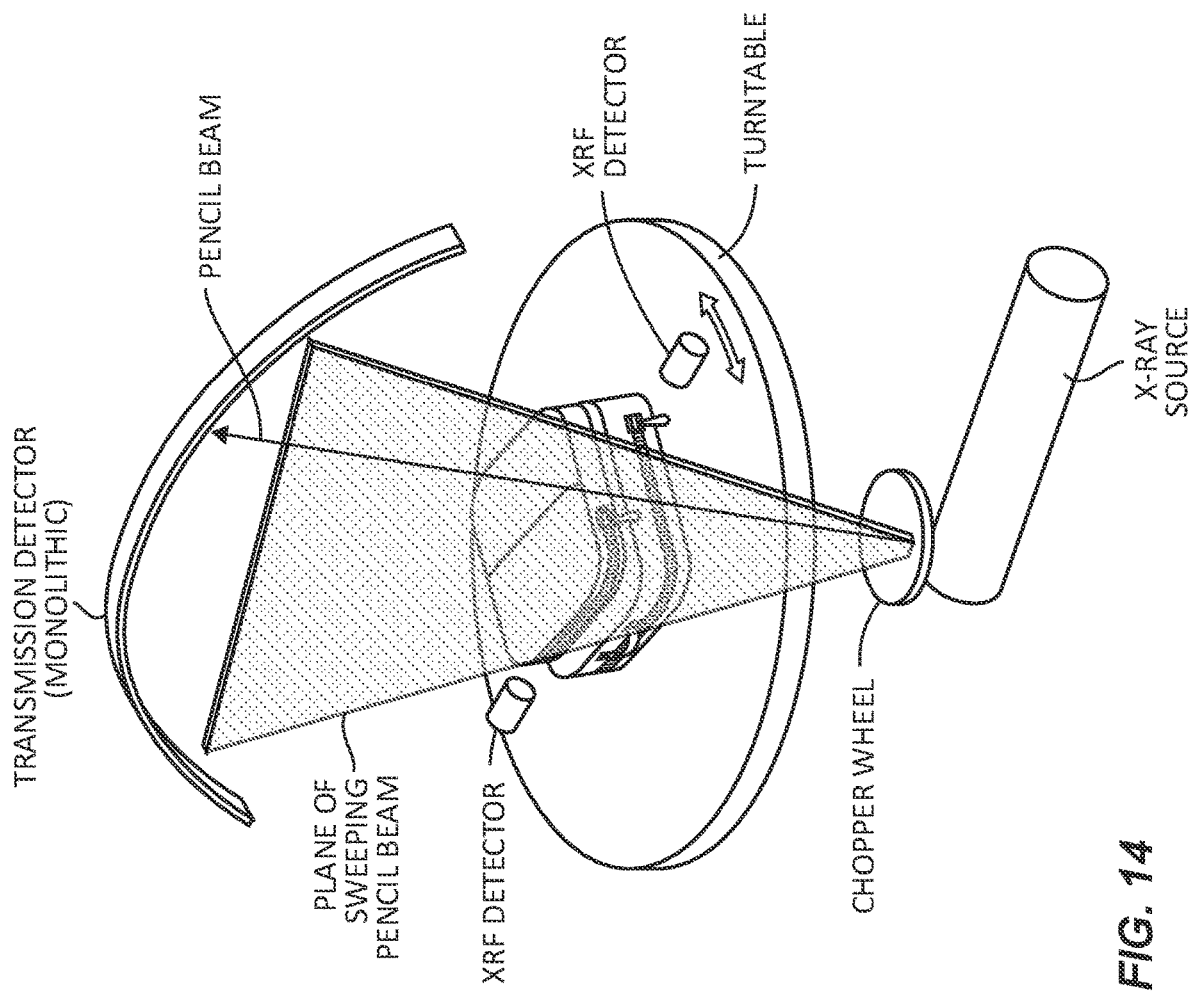
FIG. 14 is a perspective diagram illustrating an embodiment system for scanning a bag on a on a rotating turntable and a pair of XRF detectors, as in FIG. 13, but having a sweeping beam of source x-rays.

Referring to FIG. 14 with further reference to FIGS. 1-13, FIG. 14 illustrates a fourth particular embodiment. The conveyor in the system shown in FIG. 12 is replaced with a radiation-transparent turntable. Such methods of scanning by rotating the object are described in the co-pending U.S. Provisional Application No. 63/316,940, filed on Mar. 4, 2022 by applicant Viken Detection™ Corporation, entitled "Rotational X-Ray Inspection System and Method," which is hereby incorporated herein by reference in its entirety.

In greater particular, FIG. 14 is a diagram of a single-view detector system 50 that uses a sweeping pencil beam 44 and monolithic transmission detector array 46 in one embodiment. The system 50 may be configured comparably to the system 40 of FIG. 13, including the aforementioned turntable 41, X-ray source 43, segmented transmission X-ray detector 45, and controller 42. The system 50 further includes a chopper wheel 47 that may rotate at the output of the X-ray source 43 to generate the pencil beam 44 and cause the beam 44 to sweep along a plane as shown, at least a portion of the beam 44 passing through the object 49 being scanned.

In both of the systems 40, 50 described above, after the item 49 is placed on the turntable 41, the turntable 41 may rotate the item 49 (e.g., through 180 degrees or more) as it is illuminated with the respective X-ray beam such that a vertical fan beam 48 of X-rays (FIG. 13) or a sweeping beam 44 of X-rays sweeping within a plane in a substantially vertical orientation (FIG. 14), providing full coverage of the bag and its contents in the transmission image.

Optimal placement of energy-resolved XRF detectors. The XRF detectors should be placed anywhere from the generally side-direction of the scatter from the bag, and preferably more toward the backward direction, i.e. below the conveyor or the rotating platform. This means that the scattered photons are lower in energy, and for the x-ray sources that we would consider, this will typically be the optimal position.

Figure 15:
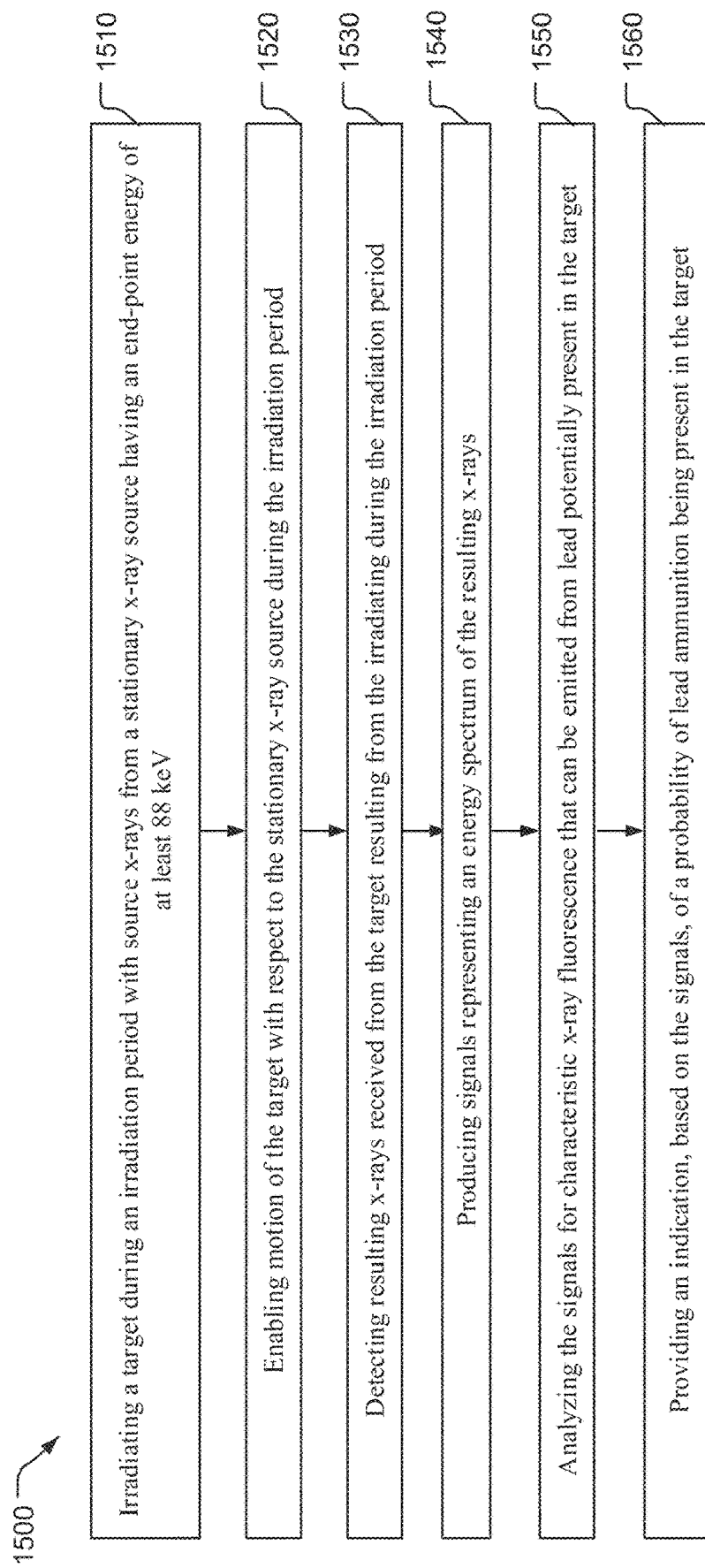
FIG. 15 is a flow diagram illustrating a generalized embodiment method that can be used to determine likelihood that ammunition is present within a target.

Referring to FIG. 15, with further reference to FIGS. 1-14, FIG. 15 is a flow diagram illustrating an embodiment method 1500 that may be used to determine likelihood that ammunition is present within a target. At a stage 1510, the method includes irradiating a target during an irradiation period with source x-rays from a stationary x-ray source having an end-point energy of at least 88 keV. At a stage 1520, the method further includes enabling motion of the target with respect to the stationary x-ray source during the irradiation period.

At a stage 1530, the method 1500 includes detecting resulting x-rays received from the target, the resulting x-rays result from the irradiating during the irradiation period. At 1540, the method also includes producing signals representing an energy spectrum of the resulting x-rays. At a stage 1550, the method further includes analyzing the signals for characteristic x-ray fluorescence that can be emitted from lead potentially present in the target. In addition, at a stage 1560, the method includes providing an indication, based on the signals, of a probability of lead ammunition being present in the target.

The method 1500 may be modified or added to on the basis of any of the claims, the implementation clauses that follow hereinafter, and elements of the embodiments described above.

Figure 16:
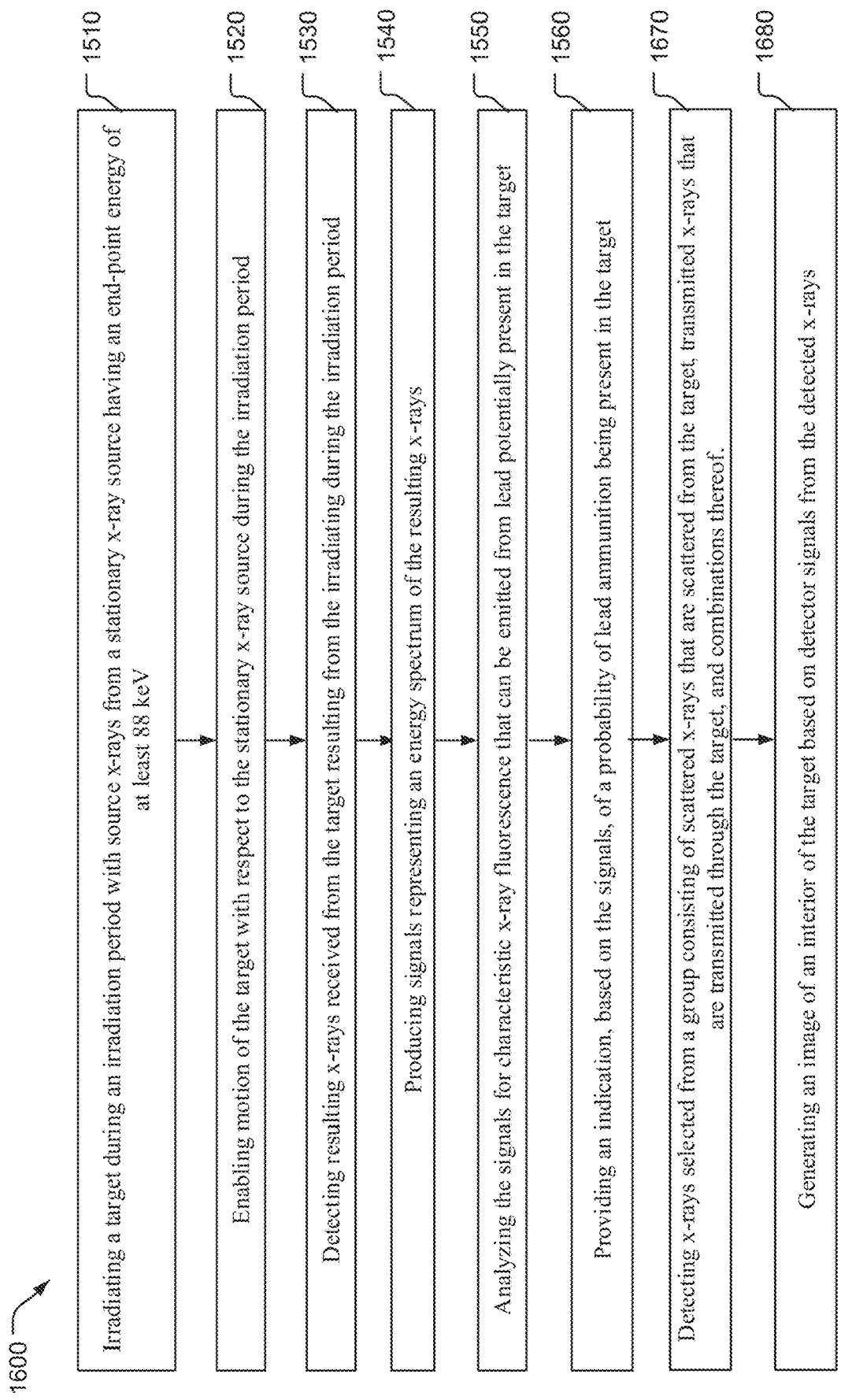
FIG. 16 is a flow diagram illustrating an embodiment method that can be used to determine likelihood that ammunition is present within a target, further including x-ray imaging the target.

FIG. 16 is a flow diagram illustrating a preferred embodiment method 1600 that includes all of the stages of the method 1500, plus stages relevant to x-ray imaging of the target in addition to XRF analysis. In particular, in addition to the stages 1510, 1520, 1530, 1540, 1550, and 1560, the method 1600 further includes two additional stages 1670 and 1680. At the stage 1670, the method 1500 further includes detecting x-rays selected from a group consisting of scattered x-rays that are scattered from the target, transmitted x-rays that are transmitted through the target, and combinations thereof. Then at the stage 1680, the method includes generating an image of an interior of the target based on detector signals from the detected x-rays.

The method 1600 may be modified or added to on the basis of any of the claims, the implementation clauses that follow hereinafter, and elements of the embodiments described above. In particular, basing a calculated probability of ammunition being present in a target on both x-ray imaging and XRF sensing provides enhanced accuracy to synergistic effect and enables greater scanning efficiency at lower cost.

Various embodiments of the present invention may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed includes the following clauses:

Clause 1. A system comprising:
 a. a stationary x-ray source configured to irradiate a target with source x-rays having an end-point energy of at least 88 keV during an irradiation period;
 b. a motion enablement feature configured to enable motion of the target with respect to the stationary x-ray source during the irradiation period;
 c. a set of energy-resolving detectors configured to detect resulting x-rays received from the target resulting from the irradiation during the irradiation period and to produce signals representing an energy spectrum of the resulting x-rays; and
 d. an analyzer configured to analyze the signals for characteristic x-ray fluorescence that can be emitted from lead potentially present in the target and to provide an indication, based on the signals, of a probability of lead ammunition being present in the target.

Clause 2. The system of clause 1, wherein the stationary x-ray source is configured to irradiate the target with the source x-rays formed into a fan beam.

Clause 3. The system of clause 1 or clause 2, wherein the stationary x-ray source forms part of an x-ray scanning module that is configured to irradiate the target with the source x-rays formed into a scanning pencil beam.

Clause 4. The system of any of clauses 1-3, further comprising a set of x-ray detectors configured to detect x-rays selected from a group consisting of scattered x-rays that are scattered from the target, transmitted x-rays that are transmitted through the target, and combinations thereof.

Clause 5. The system of clause 4, further comprising an image generator configured to receive detector signals from the set of x-ray detectors and to generate an image of an interior of the target based on the detector signals.

Clause 6. The system of clause 5, wherein the probability is based further on the image of the interior of the target.

Clause 7. The system of clause 5 or clause 6, further comprising a processor configured to analyze the image and to output, based on the image, an indication of a probability of a weapon being present in the target.

Clause 8. The system of any of clauses 1-7, wherein the motion enablement feature is configured to cause translational motion of the target with respect to the stationary x-ray source.

Clause 9. The system of clause 8, wherein the motion enablement feature is a conveyor belt.

Clause 10. The system of any of clauses 1-9, wherein the motion enablement feature is a turntable configured to cause rotational motion of the target with respect to the stationary x-ray source.

Clause 11. The system of clause 10, wherein the turntable is formed of a material substantially transparent to the source x-rays.

Clause 12. The system of any of clauses 1-11, wherein the stationary x-ray source forms part of a vehicle portal, and wherein the motion enablement feature is a passage formed by the vehicle portal enabling a vehicle to pass there through by the vehicle's power.

Clause 13. The system of any of clauses 1-12, wherein the set of energy-resolving detectors are formed at least partly of a material selected from a group consisting of cadmium telluride, cadmium zinc telluride, cesium lead bromide, and combinations thereof.

Clause 14. A method comprising:
 a. irradiating a target during an irradiation period with source x-rays from a stationary x-ray source having an end-point energy of at least 88 keV;
 b. enabling motion of the target with respect to the stationary x-ray source during the irradiation period;
 c. detecting resulting x-rays received from the target resulting from the irradiating during the irradiation period;
 d. producing signals representing an energy spectrum of the resulting x-rays;
 e. analyzing the signals for characteristic x-ray fluorescence that can be emitted from lead potentially present in the target; and
 f. providing an indication, based on the signals, of a probability of lead ammunition being present in the target.

Clause 15. The method of clause 14, wherein the irradiating is with the source x-rays formed into a fan beam.

Clause 16. The method of clause 14 or clause 15, further comprising forming the source x-rays into a scanning pencil beam formed by an x-ray scanning module of which the stationary x-ray source forms a part.

Clause 17. The method of any of clauses 14-16, further comprising detecting x-rays selected from a group consisting of scattered x-rays that are scattered from the target, transmitted x-rays that are transmitted through the target, and combinations thereof.

Clause 18. The method of clause 17, further comprising generating an image of an interior of the target based on detector signals from the detected x-rays.

Clause 19. The method of clause 18, wherein the indication of probability is based further on the image of the interior of the target.

Clause 20. The method of clause 18 or clause 19, further comprising analyzing the image by a processor and outputting, based on the image, an indication of a probability of a weapon being present in the target.

Clause 21. The method of any of clauses 14-20, wherein enabling motion of the target includes causing translational motion of the target with respect to the stationary x-ray source.

Clause 22. The method of clause 21, wherein causing the translational motion of the target includes using a conveyor belt.

Clause 23. The method of any of clauses 14-22, wherein enabling the motion includes causing rotational motion of the target with respect to the stationary x-ray source.

Clause 24. The method of clause 23, wherein causing the rotational motion includes using a turntable formed of a material substantially transparent to the source x-rays.

Clause 25. The method of any of clauses 14-24, wherein enabling motion of the target with respect to the stationary x-ray source includes enabling a vehicle to pass through a vehicle portal by the vehicle's own power.

Clause 26. The method of any of clauses 14-25, wherein detecting resulting x-rays includes using a detector formed at least partly of a material selected from a group consisting of cadmium telluride, cadmium zinc telluride, cesium lead bromide, and combinations thereof.

Clause 27. A system comprising:
 a. means for irradiating a target during an irradiation period with source x-rays from a stationary x-ray source having an end-point energy of at least 88 key;
 b. means for enabling motion of the target with respect to the stationary x-ray source during the irradiation period;
 c. means for detecting resulting x-rays received from the target resulting from the irradiating during the irradiation period;
 d. means for producing signals representing an energy spectrum of the resulting x-rays;
 e. means for analyzing the signals for characteristic x-ray fluorescence that can be emitted from lead potentially present in the target; and
 f. means for providing an indication, based on the signals, of a probability of lead ammunition being present in the target.

Clause 28. The system or method of any of clauses 1-27, wherein the source x-rays from the stationary x-ray source have an end-point energy of at least 100 keV.

Clause 29. The system or method of any of clauses 1-28, further comprising an alerting device configured to output an alert, or further comprising outputting the alert if the probability of lead ammunition being present in the target exceeds a pre-defined threshold.

Clause 30. The system or method of clause 29, wherein the output the alert or outputting the alert is based on both (i) the analysis of signals for the characteristic x-ray fluorescence, and (ii) analysis of x-ray images, generated by the system or method, of an interior of the target, for an item selected from the group consisting of a weapon, ammunition, another threat indication, and combinations thereof.

Clause 31. The system or method of any of clauses 1-30, wherein the indication of the probability is limited to binary YES or NO indication options.

Clause 32. The system or method of any of clauses 1-31, wherein the indication of the probability is limited to a finite number of percentage brackets.

Clause 33. An x-ray scanning system comprising:
 a. an x-ray source configured to irradiate a target with source x-rays having an end-point energy of at least 88 keV during an irradiation period;
 b. a set of energy-resolving detectors configured to detect resulting x-rays received from the target resulting from the irradiation during the irradiation period and to produce energy spectrum signals representative of an energy spectrum of the resulting x-rays;
 c. a set of imaging detectors configured to detect x-rays selected from the group consisting of resulting x-rays that are scattered from the target during the irradiation period, resulting x-rays that are transmitted through the target during the irradiation period, and combinations thereof
 d. the set of imaging detectors further configured to output imaging signals representative of an x-ray image of an interior of the target;
 e. an image generator configured to generate an image an x-ray image of the interior of the target based on the imaging signals; and
 f. an analyzer configured to analyze the signals for characteristic x-ray fluorescence (XRF) that can be emitted from lead potentially present in the target and to provide an indication, based on the signals, of a probability of lead ammunition being present in the target,
 g. the analyzer further configured to use the probability and the x-ray image to determine a likelihood of a security threat in the target.

Clause 34. The system of clause 33, wherein the system is mounted at a position selected from a group consisting of inside a vehicle, on a trailer, on a cart, on a platform, on a table, on a ground surface, on a floor surface, and combinations thereof.

Clause 35. The system of clause 33, wherein the system is a handheld system.

Clause 36. The system of clause 33, further including any of the features of clauses 1-32.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method of enhancing security threat detection, the method comprising:
   irradiating a target during an irradiation period with source x-rays from a stationary x-ray source having an end-point energy of at least 88 keV;
   enabling motion of the target with respect to the stationary x-ray source during the irradiation period;
   detecting resulting x-rays received from the target resulting from the irradiating during the irradiation period;
   generating an image of an interior of the target based on the detected, resulting x-rays;
   performing analysis of the image for an indication of a weapon;
   producing signals representing an energy spectrum of the resulting x-rays;
   analyzing the signals for characteristic x-ray fluorescence that can be emitted from lead potentially present in the target;
   providing an indication, based on the signals, of a probability of lead ammunition being present in the target; and
   outputting an indication of likelihood of a security threat in the target based on the analysis of the image for the indication of a weapon and on the probability of lead ammunition being present.

2. The method of claim 1, wherein the irradiating is with the source x-rays formed into a fan beam.

3. The method of claim 1, further comprising forming the source x-rays into a scanning pencil beam.

4. The method of claim 1, wherein the resulting x-rays include x-rays selected from a group consisting of scattered x-rays that are scattered from the target, transmitted x-rays that are transmitted through the target, and combinations thereof.

5. The method of claim 1, wherein enabling motion of the target includes causing translational motion of the target with respect to the stationary x-ray source.

6. The method of claim 5, wherein causing the translational motion of the target includes using a conveyor belt.

7. The method of claim 1, wherein enabling the motion includes causing rotational motion of the target with respect to the stationary x-ray source.

8. The method of claim 7, wherein causing the rotational motion includes using a turntable formed of a material substantially transparent to the source x-rays.

9. The method of claim 1, wherein enabling motion of the target with respect to the stationary x-ray source includes enabling a vehicle to pass through a vehicle portal by the vehicle's own power.

10. The method of claim 1, wherein detecting resulting x-rays includes using a detector formed at least partly of a material selected from a group consisting of cadmium telluride, cadmium zinc telluride, cesium lead bromide, and combinations thereof.

11. The method of claim 1, wherein the source x-rays from the stationary x-ray source have an end-point energy of at least 100 keV.

12. The method of claim 1, further comprising further comprising outputting an alert if the probability of lead ammunition being present in the target exceeds a pre-defined threshold.

13. The method of claim 12, wherein the outputting the alert is based on both (i) the analysis of signals for the characteristic x-ray fluorescence, and (ii) the analysis of the image for the indication of a weapon.

14. The method of claim 1, wherein the indication of the probability is limited to binary YES and NO indication options.

15. The method of claim 1, wherein the indication of the probability is limited to a finite number of percentage brackets.

16. The method of claim 1, wherein analyzing the signals for characteristic x-ray fluorescence includes analyzing lead fluorescence peak height relative to background.

17. The method of claim 1, wherein analyzing the signals for characteristic x-ray fluorescence in includes analyzing lead fluorescence peak height relative to Compton peak height.

18. A system for enhanced security threat detection, the system comprising:
   a stationary x-ray source configured to irradiate a target with source x-rays having an end-point energy of at least 88 keV during an irradiation period;
   a motion enablement feature configured to enable motion of the target with respect to the stationary x-ray source during the irradiation period;
   a set of energy-resolving detectors configured to detect resulting x-rays received from the target resulting from the irradiation during the irradiation period and to produce signals representing an energy spectrum of the resulting x-rays;
   an image generator configured to generate an image of an interior of the target based on the detected, resulting x-rays; and
   an analyzer configured to:
      analyze the signals for characteristic x-ray fluorescence that can be emitted from lead potentially present in the target;
      provide an indication, based on the signals, of a probability of lead ammunition being present in the target;
      perform analysis of the image for an indication of a weapon; and
      output an indication of likelihood of a security threat in the target based on the analysis of the image for the indication of a weapon and on the probability of lead ammunition being present.

19. A system for enhanced security threat detection, the system comprising:
   means for irradiating a target during an irradiation period with source x-rays from a stationary x-ray source having an end-point energy of at least 88 keV;
   means for enabling motion of the target with respect to the stationary x-ray source during the irradiation period;
   means for detecting resulting x-rays received from the target resulting from the irradiating during the irradiation period;

means for generating an image of an interior of the target based on the detected, resulting x-rays;

means for performing analysis of the image for an indication of a weapon;

means for producing signals representing an energy spectrum of the resulting x-rays;

means for analyzing the signals for characteristic x-ray fluorescence that can be emitted from lead potentially present in the target;

means for providing an indication, based on the signals, of a probability of lead ammunition being present in the target; and means for outputting an indication of likelihood of a security threat in the target based on the analysis of the imaged for the indication of a weapon and on the probability of lead ammunition being present.

20. An x-ray scanning system comprising:

an x-ray source configured to irradiate a target with source x-rays having an end-point energy of at least 88 keV during an irradiation period;

a set of energy-resolving detectors configured to detect resulting x-rays received from the target resulting from the irradiation during the irradiation period and to produce energy spectrum signals representative of an energy spectrum of the resulting x-rays;

a set of imaging detectors configured to detect x-rays selected from the group consisting of resulting x-rays that are scattered from the target during the irradiation period, resulting x-rays that are transmitted through the target during the irradiation period, and combinations thereof;

the set of imaging detectors further configured to output imaging signals representative of an x-ray image of an interior of the target;

an image generator configured to generate an image an x-ray image of the interior of the target based on the imaging signals; and an analyzer configured to analyze the signals for characteristic x-ray fluorescence (XRF) that can be emitted from lead potentially present in the target and to provide an indication, based on the signals, of a probability of lead ammunition being present in the target, the analyzer further configured to use the probability and the x-ray image to determine a likelihood of a security threat in the target.

* * * * *